(12) United States Patent
Kanemoto et al.

(10) Patent No.: US 10,468,711 B2
(45) Date of Patent: Nov. 5, 2019

(54) ELECTRODE PLATE, LAYERED ELECTRODE GROUP, AND BATTERY

(71) Applicant: GS Yuasa International Ltd., Kyoto-shi, Kyoto (JP)

(72) Inventors: Manabu Kanemoto, Kyoto (JP); Tadashi Kakeya, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 232 days.

(21) Appl. No.: 15/275,691

(22) Filed: Sep. 26, 2016

(65) Prior Publication Data

US 2017/0084945 A1    Mar. 23, 2017

Related U.S. Application Data

(62) Division of application No. 14/236,209, filed as application No. PCT/JP2012/068523 on Jul. 20, 2012, now abandoned.

(30) Foreign Application Priority Data

Aug. 2, 2011  (JP) ................................. 2011-169575
Aug. 2, 2011  (JP) ................................. 2011-169672

(51) Int. Cl.
*H01M 10/04*   (2006.01)
*H01M 2/18*    (2006.01)
(Continued)

(52) U.S. Cl.
CPC ......... *H01M 10/045* (2013.01); *H01M 2/022* (2013.01); *H01M 2/0227* (2013.01);
(Continued)

(58) Field of Classification Search
CPC ........... H01M 10/045; H01M 10/0422; H01M 10/0431; H01M 10/0459; H01M 2/022;
(Continued)

(56) References Cited

U.S. PATENT DOCUMENTS 3,856,575 A   12/1974  Hughes
4,029,855 A   6/1977   Dougherty
(Continued)

FOREIGN PATENT DOCUMENTS

JP   49-008726    1/1974
JP   58-206075    12/1983
(Continued)

OTHER PUBLICATIONS

Tatsuo Horiba, "Layered Secondary Battery Using Thin Electrode", Publication Jun. 22, 1999 (Year: 1999).*

(Continued)

*Primary Examiner* — Jimmy Vo
(74) *Attorney, Agent, or Firm* — Rankin, Hill & Clark LLP

(57) ABSTRACT

A layered electrode group according to the present invention includes a positive electrode plate, a negative electrode plate, and a separator. The positive electrode plate is formed into a substantial U-shape by disposing two active material retaining portions retaining the positive active material opposite to each other. The negative electrode plate is formed into a substantial U-shape by disposing two active material retaining portions retaining the negative active material opposite to each other. The positive electrode plate and the negative electrode plate are layered such that at least one active material retaining portion at the positive electrode plate is sandwiched between two active material retaining portions at the negative electrode plate.

11 Claims, 24 Drawing Sheets

(51) Int. Cl.
- *H01M 2/26* (2006.01)
- *H01M 2/30* (2006.01)
- *H01M 2/02* (2006.01)
- *H01M 4/80* (2006.01)
- *H01M 4/78* (2006.01)
- *H01M 6/02* (2006.01)

(52) U.S. Cl.
CPC ............. *H01M 2/18* (2013.01); *H01M 2/266* (2013.01); *H01M 2/30* (2013.01); *H01M 4/78* (2013.01); *H01M 4/80* (2013.01); *H01M 10/0422* (2013.01); *H01M 10/0431* (2013.01); *H01M 10/0459* (2013.01); *H01M 6/02* (2013.01); *Y10T 29/49108* (2015.01)

(58) Field of Classification Search
CPC ...... H01M 2/0227; H01M 2/18; H01M 2/266; H01M 2/30; H01M 4/78; H01M 4/80
See application file for complete search history.

(56) References Cited

U.S. PATENT DOCUMENTS

| | | |
|---|---|---|
| 6,117,583 A | 9/2000 | Nilsson et al. |
| 6,277,515 B1 | 8/2001 | Akahira |
| 2003/0049523 A1 | 3/2003 | Saito et al. |
| 2011/0287323 A1* | 11/2011 | Chen ................. H01M 4/70 429/246 |
| 2014/0011076 A1 | 1/2014 | Kanemoto et al. |

FOREIGN PATENT DOCUMENTS

| | | |
|---|---|---|
| JP | 59-091675 | 5/1984 |
| JP | 3-001455 | 1/1991 |
| JP | 7-147155 | 6/1995 |
| JP | 11-111325 | 4/1999 |
| JP | 11-167930 | 6/1999 |
| JP | 11-185767 | 7/1999 |
| JP | 11-329500 | 11/1999 |
| JP | 2003-077528 | 3/2003 |
| WO | 2012/133233 | 10/2012 |
| WO | 2013/012084 | 1/2013 |
| WO | 2013/012085 | 1/2013 |

OTHER PUBLICATIONS

International Search Report dated Sep. 4, 2012 filed in PCT/JP2012/068523.

* cited by examiner

Fig. 8
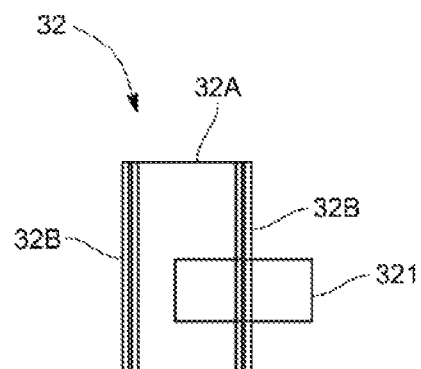
(PLAN VIEW)
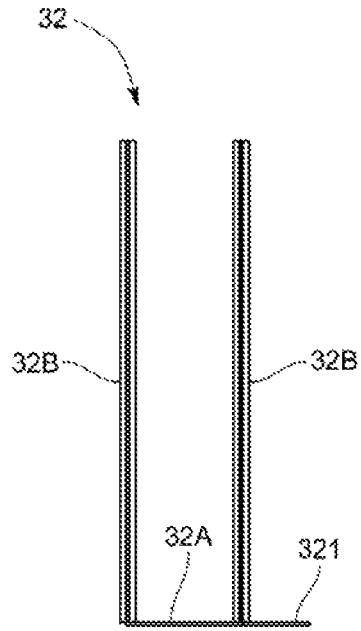
(FRONT VIEW)
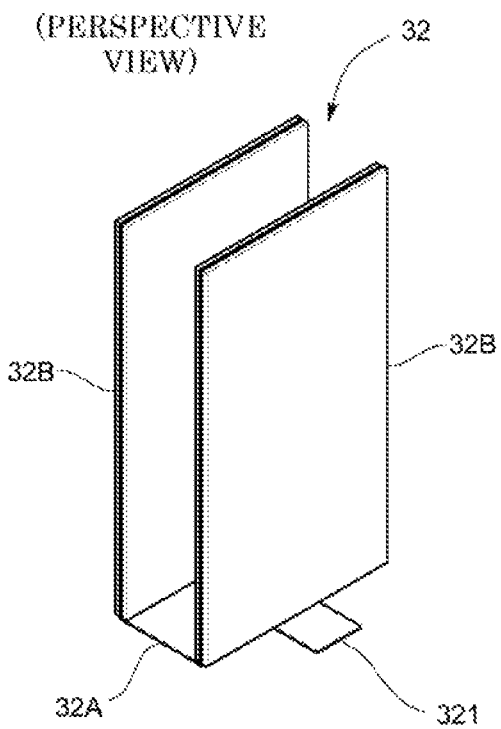
(PERSPECTIVE VIEW)

← LAYERED DIRECTION L →

← LAYERED DIRECTION L →

Fig. 25
(PLAN VIEW)
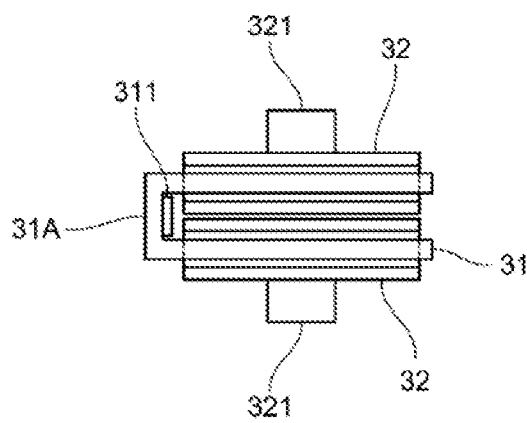
(SIDE VIEW)
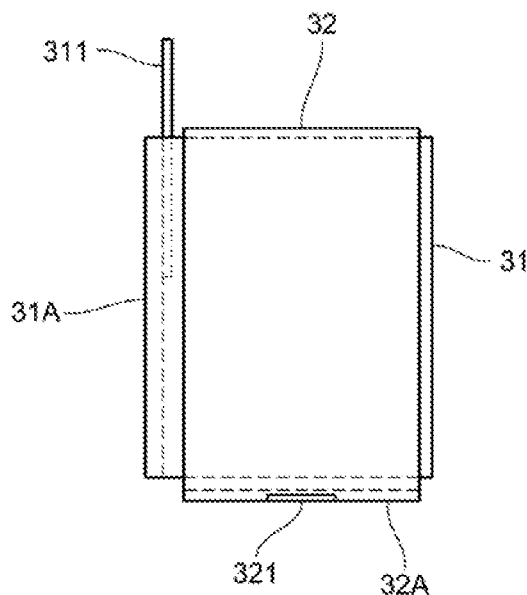
(FRONT VIEW)
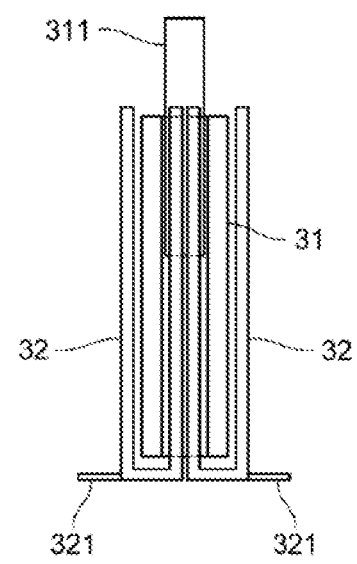

ically, in the following description.

ELECTRODE PLATE, LAYERED ELECTRODE GROUP, AND BATTERY

TECHNICAL FIELD

The present invention relates to a layered electrode group, a manufacturing method therefor, and a battery.

BACKGROUND ART

Among conventional cylindrical batteries, there is a battery containing a columnar electrode group obtained by winding belt-like positive and negative electrode plates in a spiral manner via a belt-like separator and contained in a cylindrical battery case, as disclosed in Patent Document 1.

However, a winding misalignment may occur between the positive and negative electrode plates during a winding process in the battery in which the belt-like positive and negative electrode plates and the separator are wound in the spiral manner. Then, there arises a problem that a desired battery capacity may not be achieved in the cylindrical battery or that an internal short-circuit may be caused.

PRIOR ART DOCUMENTS

Patent Documents

Patent Document 1: JP-A-11-185767

SUMMARY OF THE INVENTION

Problems to be Solved by the Invention

In view of the above, in order to solve the winding misalignment and various kinds of problems associated with the winding misalignment, the inventors of the present application have conceived containing a layered electrode group in a cylindrical battery.

However, in the case where a layered electrode group is contained in a battery case, current collecting terminals of a plurality of positive electrode plates are connected to a common current collecting plate and the current collecting plate is welded to a lid of the battery case, or the current collecting terminal of each of the positive electrode plates is welded to the lid, thereby causing variations of current collecting efficiency in each of the positive electrode plates. Moreover, work for welding the current collecting terminal of each of the positive electrode plates to a current collector or a battery case becomes complicated.

In view of the above, the present invention has been accomplished in order to solve the above-described problems. Therefore, main required problems to be solved are to commonly use a current collecting terminal at two active material retaining portions that retain an active material to prevent variations of current collecting efficiency, and further, reduce the number of current collecting terminals, thus not only simplifying a welding work but also facilitating work for layering a plurality of electrode plates.

Means for Solving the Problems

A layered electrode group according to the present invention is featured by a layered electrode group comprising a positive electrode plate retaining a positive active material in a positive electrode current collector, a negative electrode plate retaining a negative active material in a negative electrode current collector, and a separator interposed between the positive electrode plate and the negative electrode plate. The positive electrode plate is formed into a substantial U-shape by disposing two active material retaining portions retaining the positive active material opposite to each other. The negative electrode plate is formed into a substantial U-shape by disposing two active material retaining portions retaining the negative active material opposite to each other. The positive electrode plate and the negative electrode plate are layered such that at least one active material retaining portion at either one of the positive electrode plate and the negative electrode plate is sandwiched between two active material retaining portions at the other one of the positive electrode plate and the negative electrode plate. Here, the substantial U-shape is the concept encompassing a substantial V-shape, unless specifically distinguished, in the following description.

With the above-described layered electrode group, each of the positive electrode plate and the negative electrode plate is formed into the substantial U-shape with the two active material retaining portions facing each other. The common current collecting terminal collects a current at the two active material retaining portions, thus suppressing variations of current collecting efficiency to enhance the current collecting efficiency. Moreover, the current collecting terminal can be used commonly to the two active material retaining portions, thereby reducing the number of current collecting terminals to be welded to simplify a welding work. Additionally, the positive electrode plate and the negative electrode plate formed into the substantial U-shape are layered to be interlaced each other, thus remarkably simplifying work for layering the plurality of electrode plates, and further, making it difficult to untie the layered electrode group after the stacking.

A specific stacking mode of the positive electrode plate and the negative electrode plate is conceived such that a folded portion formed between the two active material retaining portions at the positive electrode plate and a folded portion formed between the two active material retaining portions at the negative electrode plate face each other in stacking. In this manner, the folded portion of the positive electrode plate and the folded portion of the negative electrode plate can be most separated from each other. When the layered electrode group is contained inside the battery case, works for welding the current collecting terminal of the negative electrode plate to the bottom of the battery case and welding the current collecting terminal of the positive electrode plate to a battery lid can be facilitated.

It is desirable that the positive electrode plates and the negative electrode plates should be layered such that one active material retaining portion at each of the two positive electrode plates adjacent to each other is sandwiched between the two active material retaining portions facing each other at one of the negative electrode plates. In this manner, the electrode plates are layered such that one negative electrode plate sandwiches two positive electrode plates, thus preventing any misalignment of the adjacent positive electrode plates as much as possible.

In the same manner, it is desirable that the positive electrode plates and the negative electrode plates should be layered such that one active material retaining portion at each of the two negative electrode plates adjacent to each other is sandwiched between the two active material retaining portions facing each other at one of the positive electrode plates. In this manner, the electrode plates are layered such that one positive electrode plate sandwiches two negative electrode plates, thus preventing any misalignment of the adjacent negative electrode plates as much as possible.

It is desirable that the separator should be folded in half to sandwich both surfaces of the positive electrode plate or the negative electrode plate in a state in which the positive electrode plate or the negative electrode plate is developed. In this manner, the positive electrode plate or the negative electrode plate in a developed state is contained in the separator, before the positive electrode plate or the negative electrode plate contained in the separator is folded, so that the separator can be securely interposed between the positive electrode plate and the negative electrode plate. Consequently, the arrangement of the plate that is not contained can be designed without any restriction by the separator, and further, a fear of a short-circuit is reduced in a manufacturing process.

It is desirable that the positive electrode plate or the negative electrode plate should have a current collecting terminal extending from a folded portion formed between the two active material retaining portions outward along a folding line of the folded portion. In this manner, the current collecting terminal is provided to extend outward along the folding line at the folded portion (that is, outward on one side in a width direction perpendicular to the direction in which the two active material retaining portions face each other). Therefore, in the case where the electrode plate in the developed state is contained to be sandwiched in the separator folded in half, the folded portion of the separator is located on a side edge other than a side edge on which the current collecting terminal extends outward, so that the current collecting terminal does not interfere a containing work in the separator.

It is desirable that in the positive electrode plate or the negative electrode plate having the current collecting terminal extending from the folded portion, the separator should be disposed to cover the positive electrode plate or the negative electrode plate, the separator having a cutout that is formed at a portion corresponding to the current collecting terminal extending from the folded portion. In this manner, it is possible to prevent the separator from curling up according to the deformation of the current collecting terminal when the current collecting terminal is folded.

It is desirable that the other one of the electrode plates sandwiching the one electrode plate should include an active material non-retaining portion which is not coated with an active material, and active material retaining portions which are formed on both sides while sandwiching the active material non-retaining portion and are coated with an active material, wherein the current collector is folded at the active material non-retaining portion such that the active material retaining portions on both sides face each other, and further, a part of the active material non-retaining portion at the other one of the electrode plates is folded outward, to form the current collecting terminal. In this manner, a part of the non-coated portion is folded to form the current collecting terminal, thereby dispensing with forming a current collecting terminal at the coated portion or welding and connecting a current collecting terminal to the coated portion. In addition, the terminal can be formed at the end of the electrode group, and therefore, the electrode group can be readily welded or brought into contact with the battery case.

It is desirable that the electrode group of a layered structure configured by using the electrode plate according to the present invention should be configured as a cylindrical battery contained in a cylindrical battery case. In the electrode group wound in a spiral manner in the related art, the positive electrode plate and the negative electrode plate are accidentally misaligned during winding, thereby raising such problems that a desired battery capacity cannot be obtained in the cylindrical battery or an internal short-circuit occurs. However, the electrode group having the layered structure is contained inside the cylindrical battery case, like the present invention, thus solving winding misalignment in the electrode group or various problems incidental to the winding misalignment. Moreover, since the battery case is formed into the cylindrical shape, it is resistant against an increase in inside pressure. In addition, since the electrode group formed into the substantially rectangular parallelepiped shape is arranged in the cylindrical battery case, the use amount of a substrate or a separator is reduced, thus enlarging a space defined inside the battery case to not only prevent any increase in battery inner pressure but also increase the amount of electrolyte solution inside the cylindrical battery.

A manufacturing method for the layered electrode group according to the present invention comprises: a negative electrode plate folding step of folding a negative electrode plate in a developed state in a substantial U-shape to sandwich two active material retaining portions disposed on both sides of a positive electrode plate in a developed state in the folded negative electrode plate; and a positive electrode plate folding step of folding the positive electrode plate in a substantial U-shape whose two active material retaining portions are sandwiched in the folded negative electrode plate.

With the above-described manufacturing method, after the positive electrode plate and the negative electrode plate are partly layered, the negative electrode plate can be folded in the substantial U-shape at the side edge of the positive electrode plate as a folding starting point, and therefore, the negative electrode plate is readily folded in the substantial U-shape. In contrast, when the positive electrode plate is folded in the substantial U-shape, the positive electrode plate can be folded in the substantial U-shape at the side edge of the negative electrode plate as a folding starting point, and therefore, the positive electrode plate is readily folded in the substantial U-shape.

It is desirable that the manufacturing method should further comprise a separator containing step of surrounding the positive electrode plate with a separator to sandwich both surfaces of the positive electrode plate in the developed state before the negative electrode plate folding step. In this manner, before the positive electrode plate is folded in the substantial U-shape, the positive electrode plate is surrounded by the separator, thereby facilitating work for interposing the separator between the positive electrode plate and the negative electrode plate that are formed into the substantial U-shape.

An electrode plate according to the present invention is featured by being formed into a substantial U-shape, in which two active material retaining portions retaining an active material in a current collector are disposed opposite to each other, wherein a current collecting terminal extends outward along a folding line of a folded portion formed between the two active material retaining portions from the folded portion. As stated above, the substantial U-shape is the concept encompassing a substantial V-shape, unless specifically distinguished.

With the above-described electrode plate, the electrode plate is formed into the substantial U-shape including the two active material retaining portions and the folded portion, and further, the current collecting terminal is disposed at the folded portion. Consequently, the common current collecting terminal collects a current at the two active material retaining portions, thus suppressing variations of current collecting efficiency to enhance the current collecting efficiency. Moreover, the current collecting terminal can be used commonly to the two active material retaining portions, thereby reducing the number of current collecting terminals to be welded to simplify a welding work. Moreover, the current collecting terminal is provided to extend outward along the folding line at the folded portion (that is, outward on one side in a width direction perpendicular to the direction in which the two active material retaining portions face each other). Therefore, in the case where the electrode plate in the developed state is contained to be sandwiched in the separator folded in half, the folded portion of the separator is located on a side edge other than a side edge on which the current collecting terminal extends outward, so that the current collecting terminal does not interfere a containing work in the separator.

Moreover, the electrode plate according to the present invention configured to allow a substantially rectangular current collector to sandwich an active material is featured by comprising an active material non-retaining portion that is substantially linearly formed and does not retain any active material, active material retaining portions that are formed on both sides while sandwiching the active material non-retaining portion therebetween and retain an active material, and a current collecting terminal disposed at the active material non-retaining portion, wherein the current collector is folded in a substantial U-shape at the active material non-retaining portion in such a manner that the active materials on both sides face each other, and the current collecting terminal extends outward along a folding line of a folded portion formed between the two active material retaining portions from the folded portion.

With the above-described electrode plate, the electrode plate is formed into the substantial U-shape comprising the two active material retaining portions and the folded portion, and further, the current collecting terminal is disposed at the folded portion. Consequently, the common current collecting terminal collects a current at the two active material retaining portions, thus suppressing variations of current collecting efficiency to enhance the current collecting efficiency. Moreover, the current collecting terminal can be used commonly to the two active material retaining portions, thereby reducing the number of current collecting terminals to be welded to simplify a welding work. Moreover, the current collecting terminal is provided to extend outward along the folding line at the folded portion (that is, outward on one side in a width direction perpendicular to the direction in which the two active material retaining portions face each other). Therefore, in the case where the electrode plate in the developed state is contained to be sandwiched in the separator folded in half, the folded portion of the separator is located on a side edge other than a side edge on which the current collecting terminal extends outward, so that the current collecting terminal does not interfere a containing work in the separator. In addition, the electrode plate can be constituted of the single current collector, thus reducing the number of parts, and further, reducing the number of man-hours required for welding the parts to each other or the like.

It is desirable that the current collector should be made of a three-dimensional metallic porous substrate. The use of the three-dimensional metallic porous substrate facilitates the manufacturing process more than in the case of the use of other current collector substrate. Moreover, the use of the three-dimensional metallic porous substrate is excellent in that excellent current collecting characteristics can be achieved even in the case of the use of an active material having a low conductivity, and therefore, higher capacity of the electrode can be achieved.

Here, the method for manufacturing the electrode plate with the three-dimensional metallic porous substrate is conceived to include: (1) an active material filling step of filling the entire current collector substrate (i.e., a preform) made of a three-dimensional metallic porous substrate with an active material; (2) an electrode plate pressing step of pressing the entire current collector substrate after this active material filling step; (3) an active material removing step of removing the active material by ultrasonic removal or the like such that an active material non-retaining portion, which is linearly formed, is formed at the center of the current collector substrate filled with the active material; (4) a pressing step of pressing the active material non-retaining portion in the current collector substrate having the active material non-retaining portion formed thereat; (5) a cutting step of cutting the current collector substrate having the active material non-retaining portion pressed thereat in a direction perpendicular to the active material non-retaining portion; (6) a terminal welding step of welding a current collector terminal to the active material non-retaining portion of the current collector obtained by cutting; and (7) a folding step of folding the current collector welded with the current collecting terminal in a substantial U-shape at the active material non-retaining portion. Alternatively, a method for manufacturing the electrode plate with the three-dimensional metallic porous substrate is conceived to include: (i) an active material filling step of filling the entire current collector substrate (i.e., a preform) made of a three-dimensional metallic porous substrate with an active material; (ii) an electrode plate pressing step of pressing the entire current collector substrate after this active material filling step; (iii) a cutting step of cutting the pressed current collector substrate in a developed shape of the electrode plate; (iv) an active material removing step of removing the active material by ultrasonic removal or the like such that an active material non-retaining portion, which is linearly formed, is formed at the center of the cut current collector substrate; (v) a pressing step of pressing the active material non-retaining portion in the current collector substrate having the active material non-retaining portion formed thereat; (vi) a terminal welding step of welding a current collector terminal to the pressed active material non-retaining portion; and (vii) a folding step of folding the current collector welded with the current collecting terminal in a substantial U-shape at the active material non-retaining portion. However, the active material once filled is removed in either of the methods, thereby losing the active material.

In view of the above, it is preferable that the active material should be filled only on both sides of the active material non-retaining portion such that the active material non-retaining portion that is linearly formed remains at the center of the current collector substrate. Specifically, a method is conceived to include: (a) a pressing step of linearly pressing the center of the current collector substrate (i.e., the preform) made of the three-dimensional metallic porous substrate, the center serving as the active material non-retaining portion; (b) an active material filling step of filling a portion other than the pressed portion as the active material non-retaining portion with the active material; (c) an electrode plate pressing step of pressing the entire current collector substrate after the active material filling step; (d) a cutting step of cutting the current collector substrate having the active material retaining portion and the active material non-retaining portion formed thereat in a direction perpendicular to the active material non-retaining portion; (e) a terminal welding step of welding the current collecting terminal to the active material non-retaining portion of the cut current collector obtained; and (f) a folding step of folding the current collector welded with the current collecting terminal in the substantial U-shape at the active material non-retaining portion. With the above-described method, it is possible to reduce the loss of the active material, to reduce the manufacturing cost. Incidentally, since the active material retaining portions are formed on both sides while sandwiching the active material non-retaining portion therebetween, the active material retaining portion and the active material non-retaining portion are different in a percentage of elongation, and therefore, they may be possibly broken on their boundary. From the viewpoint of this, the manufacturing method (1) to (7) or (i) to (vii) is preferred.

It is desirable that an electrode plate should comprise two active material retaining plates that retain an active material in a current collector and a current collecting terminal for connecting the two active material retaining plates to each other, wherein the two active material retaining plates are folded in a substantial U-shape at the current collecting terminal to face each other, and the current collecting terminal has an extension portion extending outward along a folding line of a folded portion.

With the above-described electrode plate, since the electrode plate is formed into the substantial U-shape by connecting the two active material retaining plates via the current collecting terminal, the common current collecting terminal collects a current at the two active material retaining portions, thus suppressing variations of current collecting efficiency to enhance the current collecting efficiency. Moreover, the current collecting terminal can be used commonly to the two active material retaining portions, thereby reducing the number of current collecting terminals to be welded to simplify a welding work. Moreover, the current collecting terminal is provided with an extension portion extending outward along the folding line at the folded portion (that is, outward on one side in a width direction perpendicular to the direction in which the two active material retaining portions face each other). Therefore, in the case where the electrode plate in the developed state is contained to be sandwiched in the separator folded in half, the folded portion of the separator is located on a side edge other than a side edge on which the current collecting terminal extends outward, so that the current collecting terminal does not interfere a containing work in the separator.

Here, it is conceived that two strip-like terminals are welded in a T-shape, thereby providing the current collecting terminals. However, in order to reduce the number of parts, the man-hours required for welding, or the like, it is desirable that the current collecting terminal should be a flat plate formed into a T-shape, as viewed on a plane.

It is desirable that the electrode plate should be sandwiched at both surfaces thereof by the two-folded separator in the developed state. At this time, particularly, the folded portion of the separator should be desirably located on a side edge other than a side edge on which the current collecting terminal at the first electrode plate extends outward such that the arrangement of the current collecting terminal of the first electrode plate can prevent the current collecting terminal from interfering the separator. In this manner, the folded portion of the separator is located on the side other than the side on which the current collecting terminal extends outward, and therefore, the configuration in which the current collecting terminal extends outward on one side in the width direction perpendicular to the direction in which the two active material retaining portions face each other can prevent the current collecting terminal from interfering a containing work with the separator. Although an envelope-like separator may be used, the two-folded separator can more facilitate containing work of the electrode plate.

The electrode group, to which the electrode plate according to the present invention is preferably applicable, has a layered structure in which the electrode plates having different polarities are interposed between the active material retaining portions on both sides via the separator. In the electrode plate according to the present invention, the active material retaining portions are formed on both sides while sandwiching the active material non-retaining portion that is linearly formed or the current collecting terminal, and then, are folded at the active material non-retaining portion or the current collecting terminal. Here, the active material retaining portions that are folded to face each other have the same polarity. With this configuration, the layered electrode group can be configured only by sandwiching the electrode plates having different polarities between the active material retaining portions facing each other. Incidentally, a pocket type electrode, an electrode made of a three-dimensional substrate such as foamed nickel filled with an active material, and an electrode having a two-dimensional substrate such as a porous steel plate coated with the active material may be used as the electrode plate having the different polarity. At this time, one negative electrode plate and one positive electrode plate constitute the layered electrode group.

An electrode plate preferably used in the relationship with the first electrode plate comprising the electrode plate according to the present invention desirably should include a second electrode plate having a different polarity from that of the first electrode plate and having a current collector coated with an active material. The second electrode plate includes a linear non-coated portion that is not coated with the active material and coated portions formed on both sides while sandwiching the non-coated portion therebetween and coated with the active material. The current collector is folded at the non-coated portion such that the coated portions on both sides face each other, and further, a part of the non-coated portion is folded outward, thereby forming the current collecting terminal. The first electrode plate is sandwiched between the coated portions on both sides to configure the layered structure.

With the above-described second electrode plate, the coated portions on both sides are formed while sandwiching the linear non-coated portion therebetween, and then, are folded at the non-coated portion, and further, the current collecting terminal is formed by folding a part of the non-coated portion outward. Therefore, the common current collecting terminal collects a current at the two coated portions, thus suppressing variations of current collecting efficiency to enhance the current collecting efficiency. Moreover, the current collecting terminal can be used commonly to the two coated portions, thereby reducing the number of current collecting terminals to be welded to simplify a welding work. Moreover, a part of the non-coated portion is folded to form the current collecting terminal, dispensing with forming the current collecting terminal at the coated portion or welding and connecting the current collecting terminal to the coated portion. In addition, the non-coated portion is linear, and therefore, the current collector can be coated with the active material in a strip fashion in the manufacturing step for the second electrode plate, thus enhancing production efficiency of the second electrode plate.

Advantages of the Invention

According to the present invention such configured as described above, it is possible to commonly use a current collecting terminal at two active material retaining portions that retain an active material to prevent variations of current collecting efficiency, and further, reduce the number of current collecting terminals, thus not only simplifying a welding work but also facilitating work for layering a plurality of electrode plates.

BRIEF DESCRIPTION OF THE DRAWINGS

FIG. 8 depicts a plan view, a front view, and a perspective view showing a negative electrode plate in the embodiment

FIG. 25 depicts a side view, a plan view, and a front view showing a modification of a layered electrode group

MODE FOR CARRYING OUT THE INVENTION

A description will be given below of one embodiment of a cylindrical battery according to the present invention with reference to the attached drawings.

Figure 1:
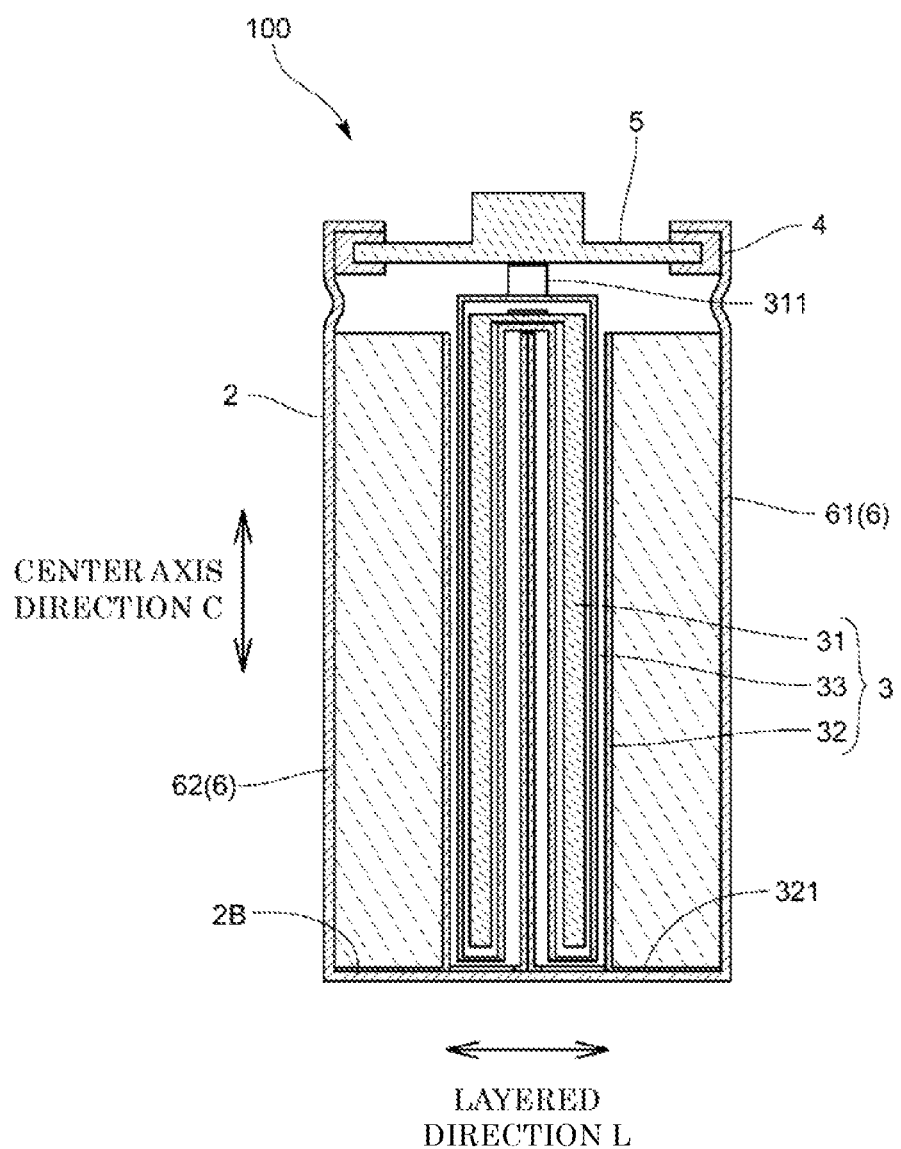
FIG. 1 depicts a vertically cross-sectional view showing a cylindrical battery in the present embodiment
Figure 2:
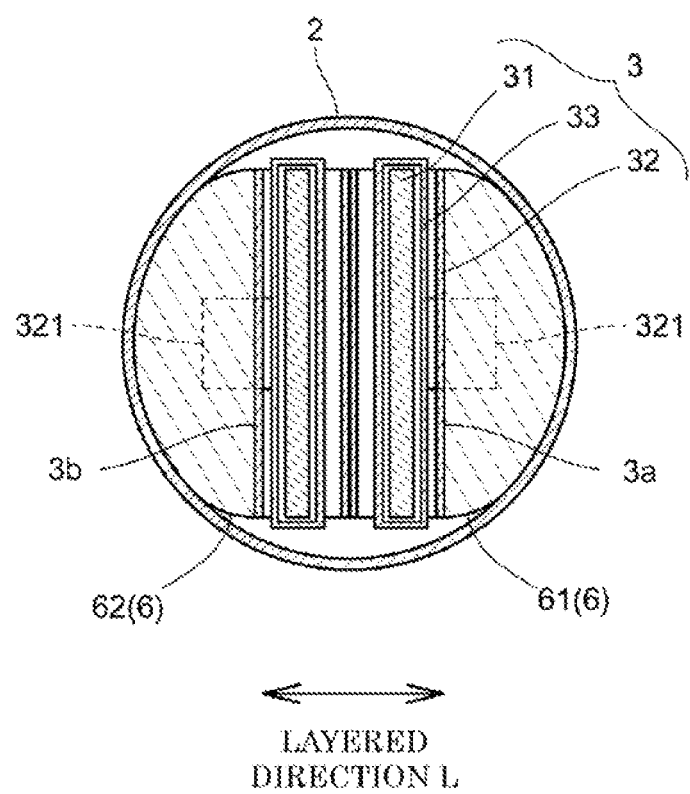
FIG. 2 depicts a laterally cross-sectional view showing the cylindrical battery in the present embodiment

A cylindrical battery 100 in the present embodiment is an alkaline secondary battery such as a nickel-cadmium storage battery or a nickel-metal hydride storage battery. Specifically, the cylindrical battery 100 may be of a low capacity type such as an AA size battery capacity of 1800 mAh or less or an AAA size battery capacity of 650 mAh or less. As shown in FIGS. 1 and 2, the cylindrical battery 100 includes a metallic battery case 2 formed into a bottomed cylindrical shape and an electrode group 3 formed into a substantially rectangular parallelepiped shape that is housed inside the battery case 2 and includes a positive electrode plate 31, a negative electrode plate 32, and a separator 33.

The battery case 2 is formed into a shape of a bottomed cylinder plated with nickel. As shown in FIG. 1, an upper opening is sealed with a sealant 5 via an insulator 4. The back surface of the sealant 5 is connected with a current collecting terminal 311 projecting from the upper end of the positive electrode plate 31 directly by welding or via a current collecting plate, not shown, and thus, the sealant 5 serves as a positive electrode terminal. Here in the present embodiment, a current collecting terminal 321 of the negative electrode plate 32 positioned at the outermost side of the electrode group 3 is welded onto a bottom 2B of the battery case 2, as described later.

Figure 3:
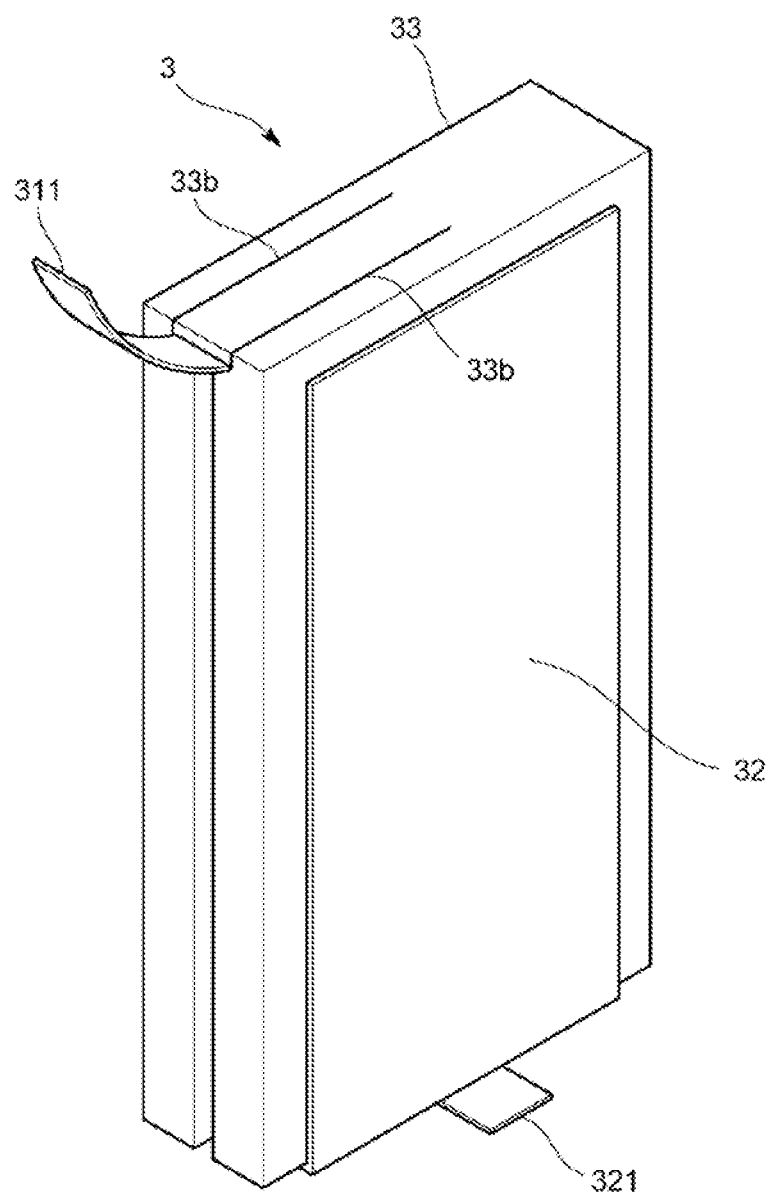
FIG. 3 depicts a perspective view showing an electrode group in the embodiment

The electrode group 3 is formed into the substantially rectangular parallelepiped shape by layering the positive electrode plate 31 and the negative electrode plate 32 via the separator 33 made of, for example, a polyolefin non-woven fabric (see FIG. 3). Incidentally, the separator 33 is impregnated with an electrolyte solution including potassium hydroxide or the like.

The positive electrode plate 31 includes a positive electrode current collector that is made of foamed nickel and is filled with a mixture of a nickel hydroxide active material and a conductive cobalt compound (hereinafter simply referred to as a positive active material) at the hollow thereof. Here, the nickel hydroxide active material is nickel hydroxide, for example, in the case of the nickel-cadmium storage battery or nickel hydroxide added with calcium hydroxide in the case of the nickel-metal hydride storage battery.

Figure 4:
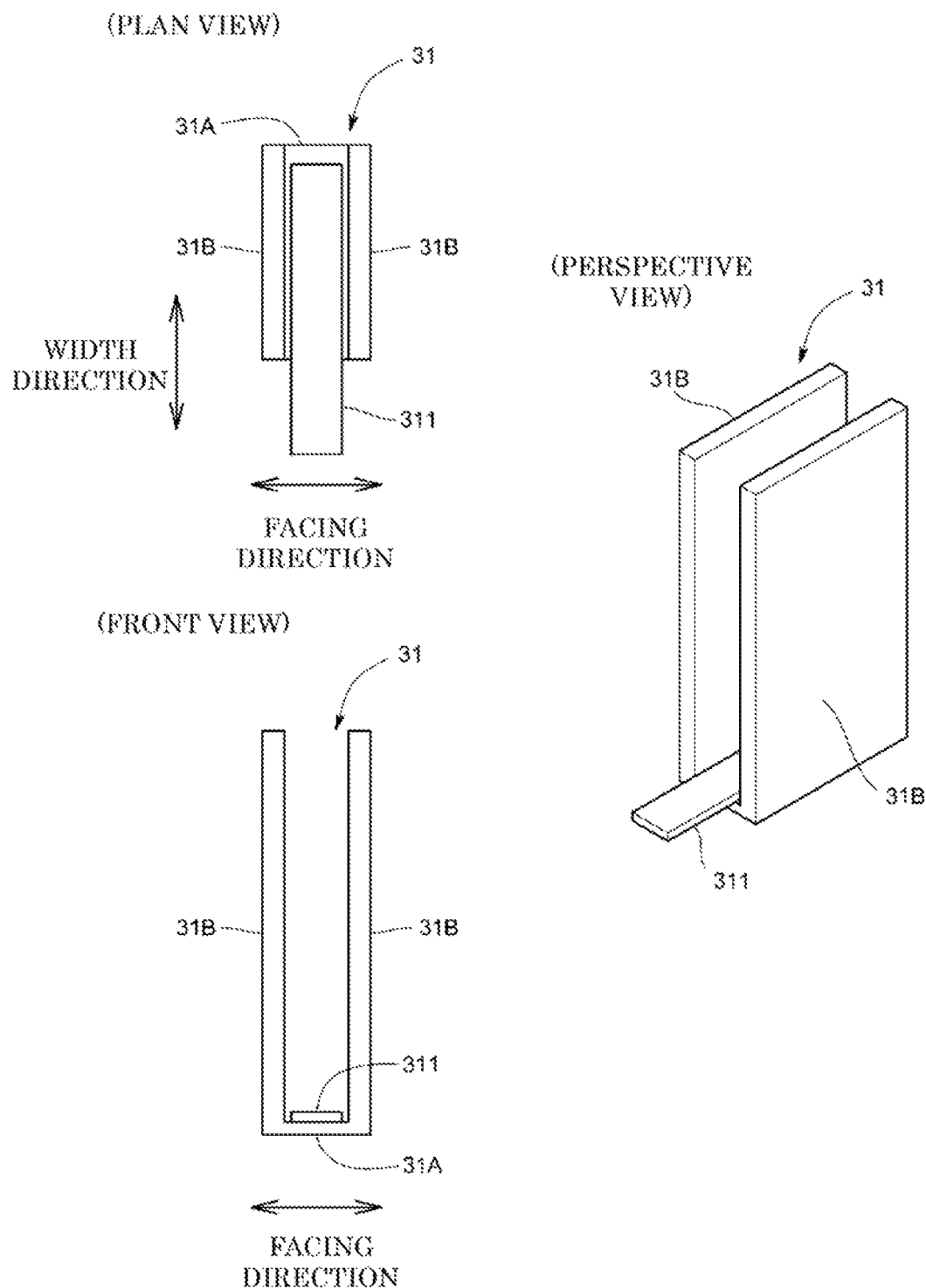
FIG. 4 depicts a plan view, a front view, and a perspective view showing a positive electrode plate in the embodiment
Figure 5:
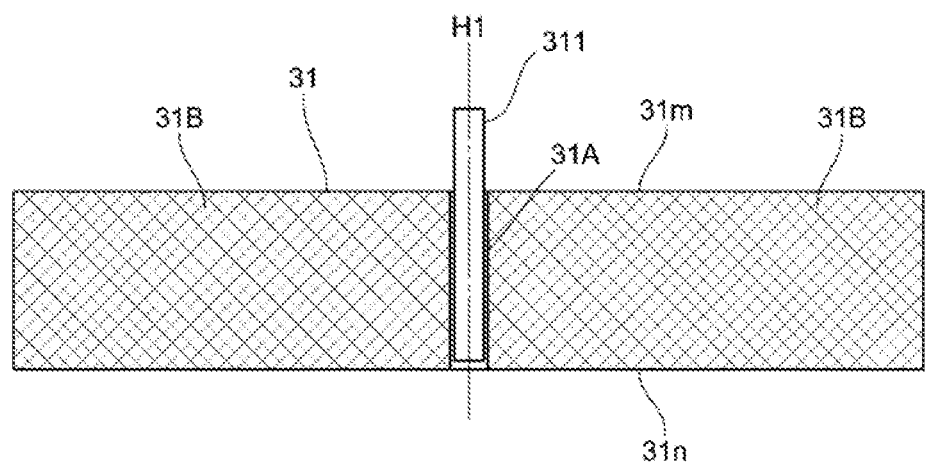
FIG. 5 depicts a plan view showing the positive electrode plate in a developed state in the embodiment

Specifically, the positive electrode plate 31 includes an active material non-retaining portion 31A that is linearly formed and does not retain a positive active material and active material retaining portions 31B that are formed on both sides of the active material non-retaining portion 31A sandwiched therebetween and retain a positive active material, as shown in FIGS. 4 and 5. The active material non-retaining portion 31A is symmetrically formed in such a manner as to include the center line H1 of the positive electrode current collector, and the active material retaining portions 31B are symmetrically formed with respect to the active material non-retaining portion 31A (see FIG. 5).

As shown in FIG. 4, in the positive electrode plate 31, the positive electrode current collector is folded in a substantial U-shape at the active material non-retaining portion 31A in such a manner that the active material retaining portions 31B on both sides face each other. Specifically, while the boundary between the active material non-retaining portion 31A and each of the active material retaining portions 31B or a slightly inward of the boundary is used as a folded line, the positive electrode plate 31 is folded such that the active material non-retaining portion 31A and each of the active material retaining portions 31B form right angles with respect to each other.

Moreover, in the positive electrode plate 31, the current collecting terminal 311 made of, for example, a nickel steel plate is placed on the active material non-retaining portion 31A serving as the folded portion formed between the two active material retaining portions 31B. The current collecting terminal 311 extends outward in one width direction perpendicular to a facing direction in which the two active material retaining portions 31B face each other. In FIG. 4, the current collecting terminal 311 extends outward in one direction (i.e., forward in FIG. 4) in the same direction as a straight direction of the active material non-retaining portion 31A. The current collecting terminal 311 is disposed over substantially the entire active material non-retaining portion 31A in order to enhance current collection efficiency of the positive electrode current collector. Besides the positive electrode current collector that extends in the same direction as the active material non-retaining portion 31A, the positive electrode current collector may be inclined as long as it extends from the side of the active material non-retaining portion 31A (an upper side edge 31$m$ or a lower side edge 31$n$ in the plan view of FIG. 4 or FIG. 5). In this manner, the current collecting terminal 311 extends outward in one width direction perpendicular to the facing direction in which the two active material retaining portions 31B face each other. Therefore, when the positive electrode plate 31 in the expanded state is contained in such a manner as to be sandwiched between the two folded portions of the separator 33, the folded portion of the separator 33 is located at the side 31$n$ facing the side 31$m$ at which the current collecting terminal 311 extends outward, so that the current collecting terminal 311 cannot interfere the containing work in the separator 33.

Next, brief explanation will be made on a manufacturing method for the positive electrode plate 31 such configured as described above.

Figure 6:
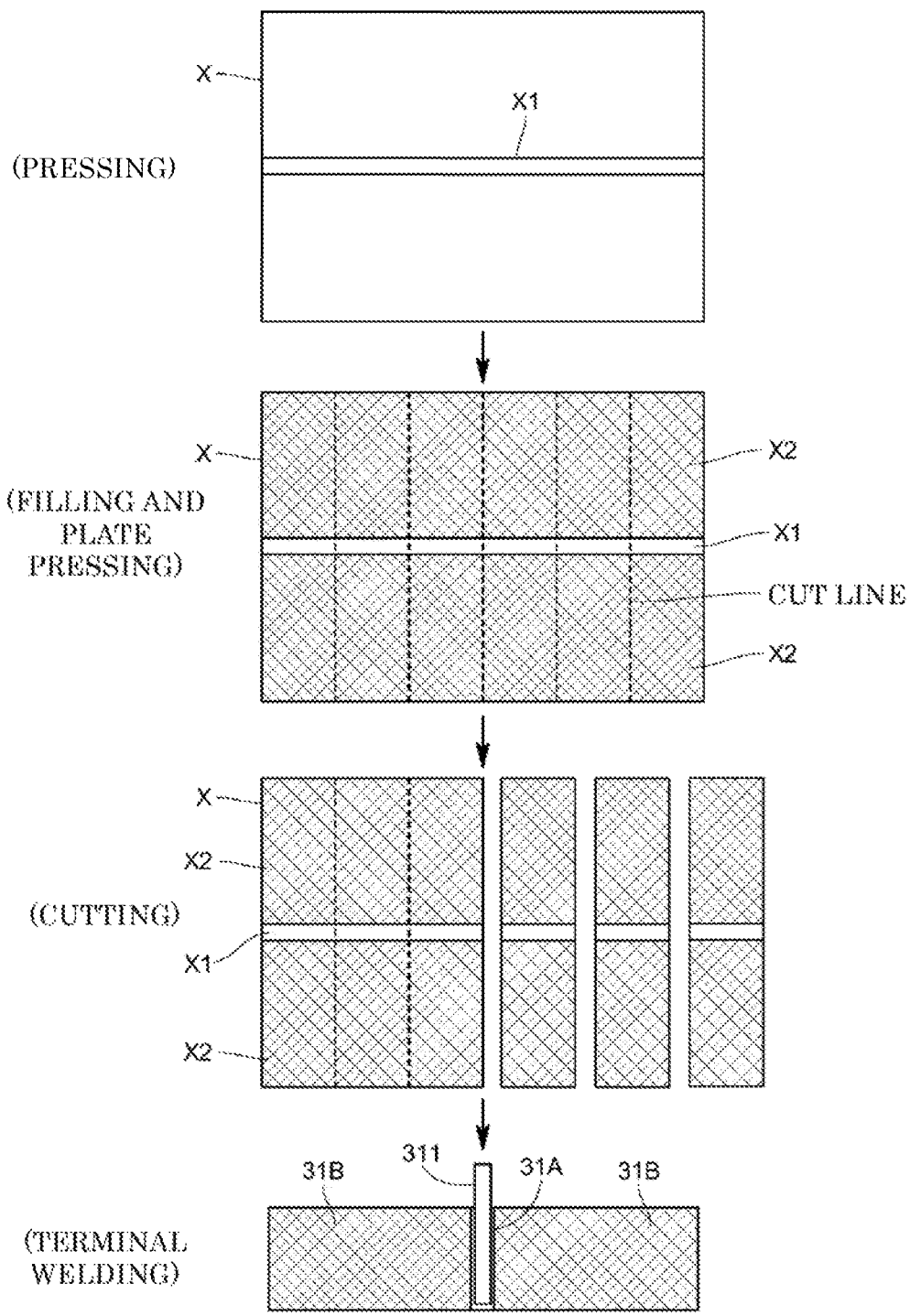
FIG. 6 depicts views showing manufacturing processes for the positive electrode plate in the embodiment

First, as illustrated in FIG. 6, a portion serving as an active material non-retaining portion (i.e., a non-retaining region X1), which is linearly formed, is pressed against an elongated preform (i.e., a current collector substrate) X made of foamed nickel at the center along a longitudinal direction (a pressing step). Subsequently, the preform X is filled with a positive active material such that portions other than the non-retaining region X1 become active material retaining portions (i.e., retaining regions X2) (an active material filling step). After the active material filling step, the entire current collector substrate is pressed (an electrode plate pressing step). Thereafter, the preform X is cut in a direction perpendicular to the non-retaining region X1 in such a manner as to form the same shape as that of the positive electrode plate (except the terminal) in the developed state (a cutting step). Here, broken lines in FIG. 6 indicate cutting lines. The current collecting terminal 311 is welded to the active material non-retaining portion 31A of the positive electrode current collector obtained by cutting in the above-described manner (a terminal welding step). In this manner, the positive electrode plate 31 in the developed state is formed. With this method, it is possible to reduce a loss of the positive active material, thus reducing a manufacturing cost.

Figure 7:
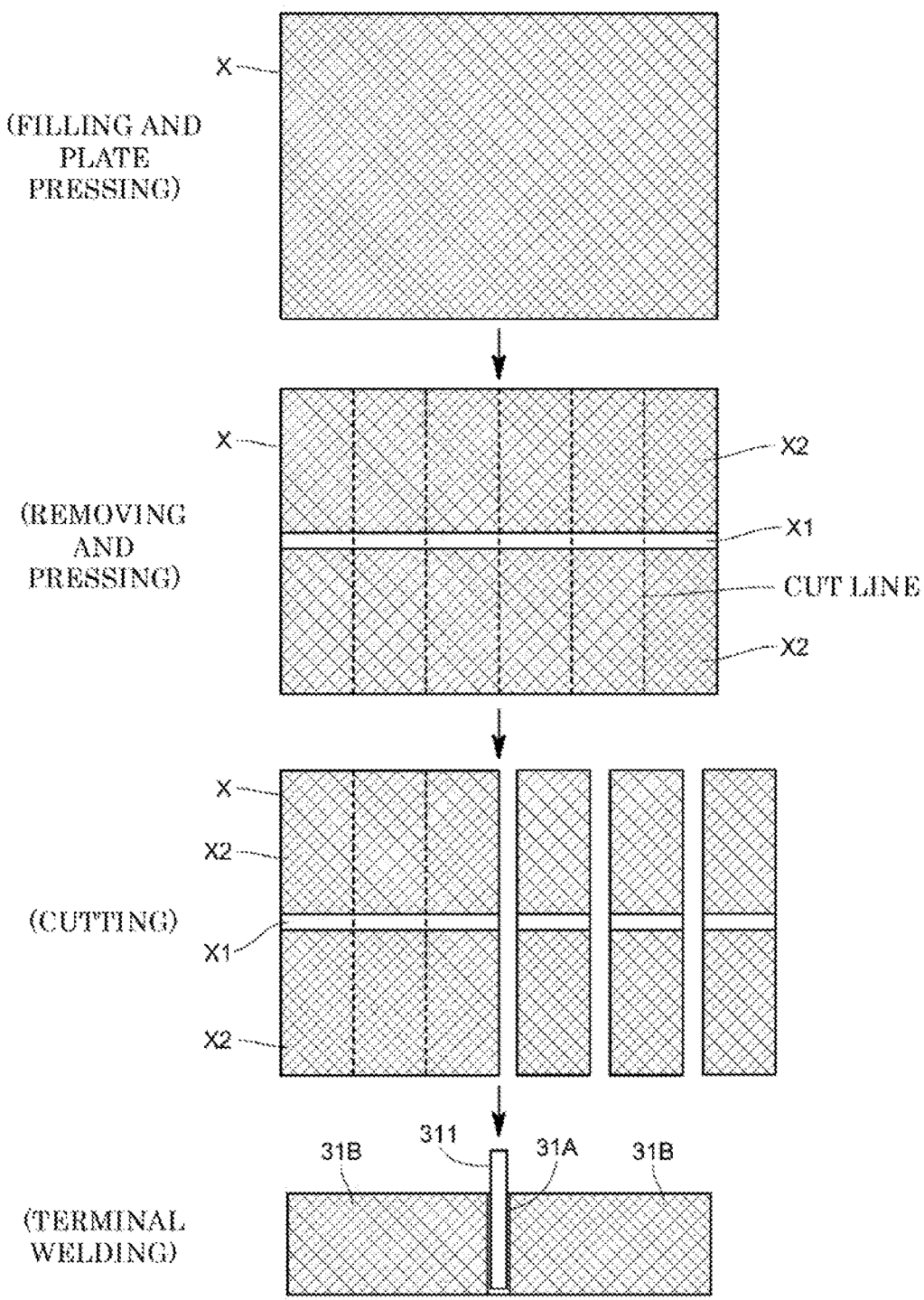
FIG. 7 depicts views showing a modification of the manufacturing processes for the positive electrode plate in the embodiment

In the above-described method, the active material non-retaining portion 31A can be formed without filling the preform X with the positive active material, and then, the active material retaining portions 31B are formed on both sides of the active material non-retaining portion 31A while sandwiching the active material non-retaining portion 31A therebetween. Consequently, each of the active material retaining portions 31B and the active material non-retaining portion 31A are different in a percentage of elongation from each other, and thus, they may be possibly broken at the boundary portion therebetween. In view of this, using a method below may be conceived. That is to say, as illustrated in FIG. 7, the entire preform X (i.e., the entire current collector substrate) made of foamed nickel is filled with a positive active material (an active material filling step). After this active material filling step, the entire current collector substrate X is pressed (an electrode plate pressing step). Subsequently, the positive active material is removed by ultrasonic removal or the like such that a non-retaining region X1 serving as an active material non-retaining portion 31A, which is linearly formed, is formed at the center of the preform X filled with the positive active material (an active material removing step). The non-retaining region X1 in the preform X having the non-retaining region X1 formed therein is pressed (a pressing step). Thereafter, the preform X having the non-retaining region X1 pressed thereat is cut in a direction perpendicular to the non-retaining region X1 (a cutting step). Here, broken lines in FIG. 7 indicate cutting lines. The current collecting terminal 311 is welded to the active material non-retaining portion 31A of the positive electrode current collector obtained by cutting in the above-described manner (a terminal welding step). In this manner, the positive electrode plate 31 in the developed state is formed.

Alternatively, the cutting step may be performed between the plate pressing step and the active material removing step. In other words, the entire preform X (i.e., the entire current collector substrate) made of the foamed nickel is filled with the positive active material (an active material filling step). After this active material filling step, the entire current collector substrate X is pressed (an electrode plate pressing step). Subsequently, the pressed preform X is cut into the developed shape of the positive electrode plate 31 (a cutting step). And then, the positive active material is removed by ultrasonic removal or the like such that a non-retaining region X1 serving as an active material non-retaining portion 31A, which is linearly formed, is formed at the center of the cut preform X filled with the positive active material (an active material removing step). The non-retaining region X1 in the preform X having the non-retaining region X1 formed therein is pressed (a pressing step). In the end, the current collecting terminal 311 is welded to the active material non-retaining portion 31A of the positive electrode current collector (a terminal welding step).

The negative electrode plate 32 includes a negative electrode current collector made of a plate-like porous steel plate plated with nickel, for example, and a negative active material coating the negative electrode current collector. Here, the negative active material is a mixture of cadmium oxide powder and metallic cadmium powder, for example, in the case of the nickel-cadmium storage battery, or powder of a hydrogen storage alloy of an $AB_5$ type (rare earth based) or an $AB_2$ type (a Laves phase), for example, in the case of the nickel-metal hydride storage battery.

Figure 9:
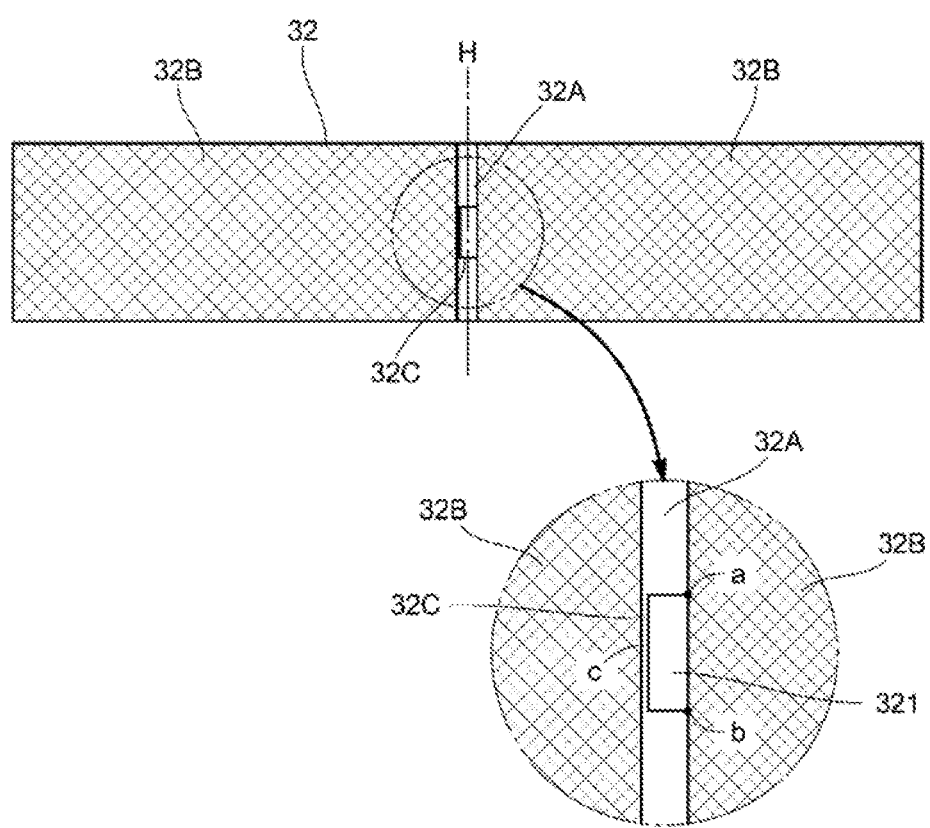
FIG. 9 depicts a plan view showing the negative electrode plate in a developed state in the embodiment

Specifically, the negative electrode plate 32 includes an active material non-retaining portion (non-coating part) 32A that is linearly formed and does not retain a negative active material and active material retaining portions (coating part) 32B that are formed on both sides of the active material non-retaining portion 32A sandwiched therebetween and retain a negative active material, as shown in FIGS. 8 and 9. The active material non-retaining portion 32A is symmetrically formed in such a manner as to include the center line H2 of the negative electrode current collector, and the negative active material retaining portions 32B are symmetrically formed with respect to the active material non-retaining portion 32A (see FIG. 9).

As shown in FIG. 8, in the negative electrode plate 32, the negative electrode current collector is folded in a substantial U-shape at the active material non-retaining portion 32A in such a manner that the negative active material retaining portions 32B on both sides face each other. Specifically, the boundary between the active material non-retaining portion 32A and each of the negative active material retaining portions 32B or a slightly inward of the boundary is used as a folded line, and then, the negative electrode plate 32 is folded such that the active material non-retaining portion 32A and each of the negative active material retaining portions 32B form right angles with respect to each other.

Moreover, a part of the active material non-retaining portion 32A is folded outward, thereby forming the current collecting terminal 321 that is welded and connected onto the bottom 2B of the battery case 2 in the negative electrode plate 32. Specifically, a cutout 32C in the conformity with the desired shape of the current collecting terminal is formed at a part of the active material non-retaining portion 32A, and then, the inside of the cutout 32C is folded outward, thus obtaining the current collecting terminal 321.

In the cutout 32C, both of a cutout starting point a and a cutout ending point b are located on the boundary between the active material non-retaining portion 32A and the negative active material retaining portion 32B, as illustrated in FIG. 9. A cutout line c connecting the cutout starting point a and the cutout ending point b to each other is contained inside the active material non-retaining portion 32A. In the present embodiment, the desired shape of the current collecting terminal is rectangular, and therefore, the cutout line c is formed into a substantial U-shape, as viewed on the plane.

While the boundary between the active material non-retaining portion 32A and the negative active material retaining portion 32B or slightly inward of the boundary is used as a folding line, the current collecting terminal 321 formed inside the cutout 32C is folded outward of the negative active material retaining portion 32B in a facing direction in which the negative active material retaining portions 32B face each other. In the folded state, the planar direction of the active material non-retaining portion 32A and the planar direction of the current collecting terminal 321 are substantially the same as each other, and further, the active material non-retaining portion 32A and the current collecting terminal 321 are located within substantially the same plane. Consequently, in the state in which the negative electrode plate 32 is contained inside the battery case 2, the active material non-retaining portion 32A can be brought into contact with the bottom 2B of the battery case 2, and further, the current collecting terminal 321 can be brought into contact with the bottom 2B of the battery case 2. As a consequence, when the current collecting terminal 321 is welded, the negative electrode plate 32 can be stabilized inside the battery case 2, thereby facilitating a welding work. In addition, the flat active material non-retaining portion 32A can be disposed in such a manner as to be brought into contact with the bottom 2B of the battery case 2, thus effectively utilizing a space defined inside the battery case 2.

Next, brief explanation will be made on a manufacturing method for the negative electrode plate 32 such configured as described above.

Figure 10:
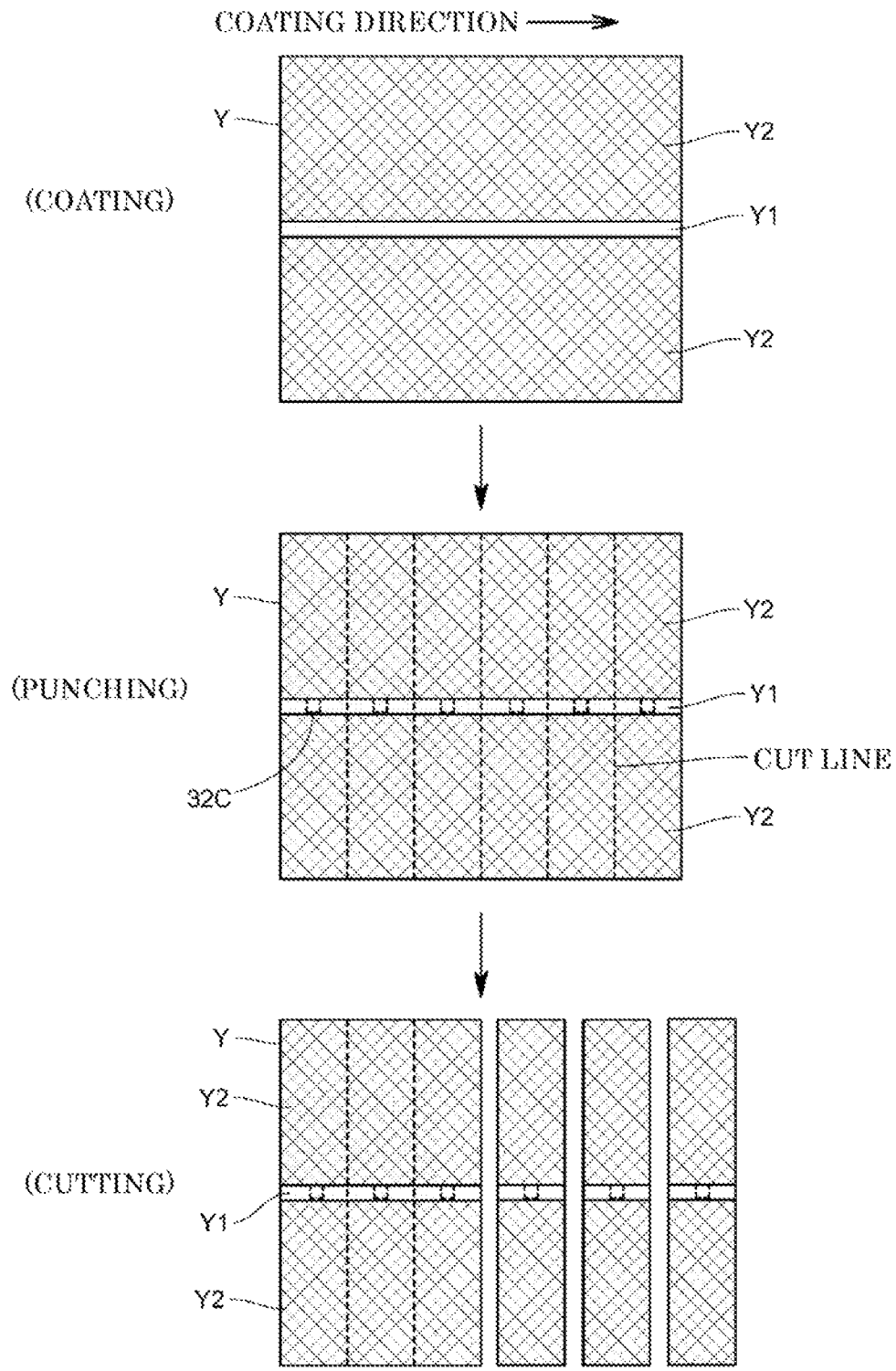
FIG. 10 depicts views showing manufacturing processes for the negative electrode plate in the embodiment

First, as illustrated in FIG. 10, an elongated preform (i.e., a current collector substrate) Y made of a porous steel plate is coated on both sides of a linear non-coated region Y1 with a negative active material with the non-coated region Y1 remaining at the center along a longitudinal direction, thus forming coating regions Y2 (a coating step). And then, the substantially U-shaped cutout 32C is punched in the non-coated region Y1 by using a punch die (a punching step). Thereafter, the preform Y is cut in conformity with the same shape as that of the developed state of the negative electrode plate 32 (a cutting step). Here, broken lines in FIG. 10 indicate cutting lines. In this manner, the negative electrode plate 32 in the developed state can be formed. Incidentally, the cutout 32C may be formed after the negative electrode plate 32 is cut.

Figure 11:
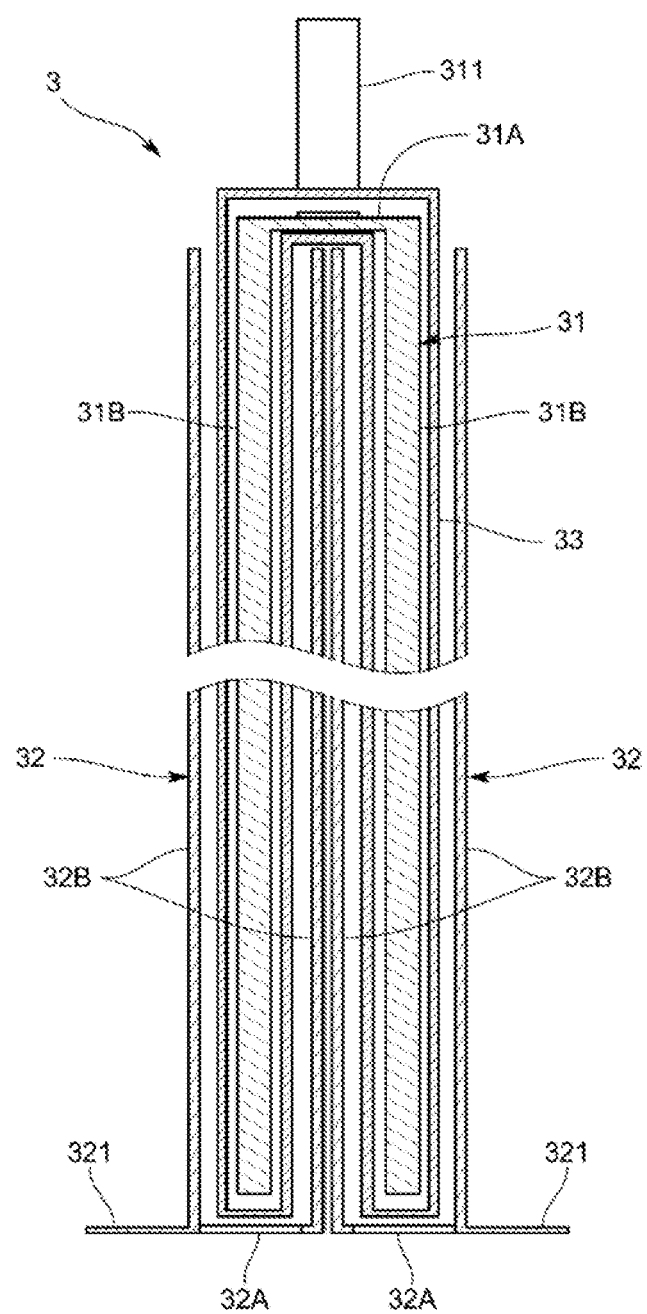
FIG. 11 depicts a vertically cross-sectional view showing the electrode group in the embodiment

Hence, the layered electrode group 3 in the present embodiment is configured by layering the positive electrode plate 31 having the two active material retaining portions 31B disposed opposite to each other in the substantial U-shape and the negative electrode plate 32 having the two active material retaining portions 32B disposed opposite to each other in the substantial U-shape in such a manner as to be interlaced with each other. Specifically, the electrode plates are layered such that one of the active material retaining portions 31B in the positive electrode plate 31 is sandwiched between the two active material retaining portions 32B in the negative electrode plate 32 whereas one of the active material retaining portions 32B in the negative electrode plate 32 is sandwiched between the two active material retaining portions 31B in the positive electrode plate 31, as shown in FIG. 11. In the present embodiment, the electrode plates are layered such that the folded portion (the active material non-retaining portion 31A) of the positive electrode plate 31 and the folded portion (the active material non-retaining portion 32A) of the negative electrode plate 32 are opposite to each other. Here, although clearances are defined between each of the electrode plates 31 and 32 and the separator 33 in FIGS. 1, 2, 11, and the like, for the sake of easy understanding, they are actually brought into contact with each other in stacking.

More particularly, the layered electrode group 3 in the present embodiment is constituted of the two negative electrode plates 32 and one positive electrode plate 31. The electrode plates are layered such that one active material retaining portion 32B of each of the adjacent two negative electrode plates 32 (the active material retaining portions 32B adjacent to each other in the two negative electrode plates 32) is sandwiched between the two active material retaining portions 31B of the one positive electrode plate 31.

Next, explanation will be made on a manufacturing method for the layered electrode group 3 such configured as described above.

Figure 12:
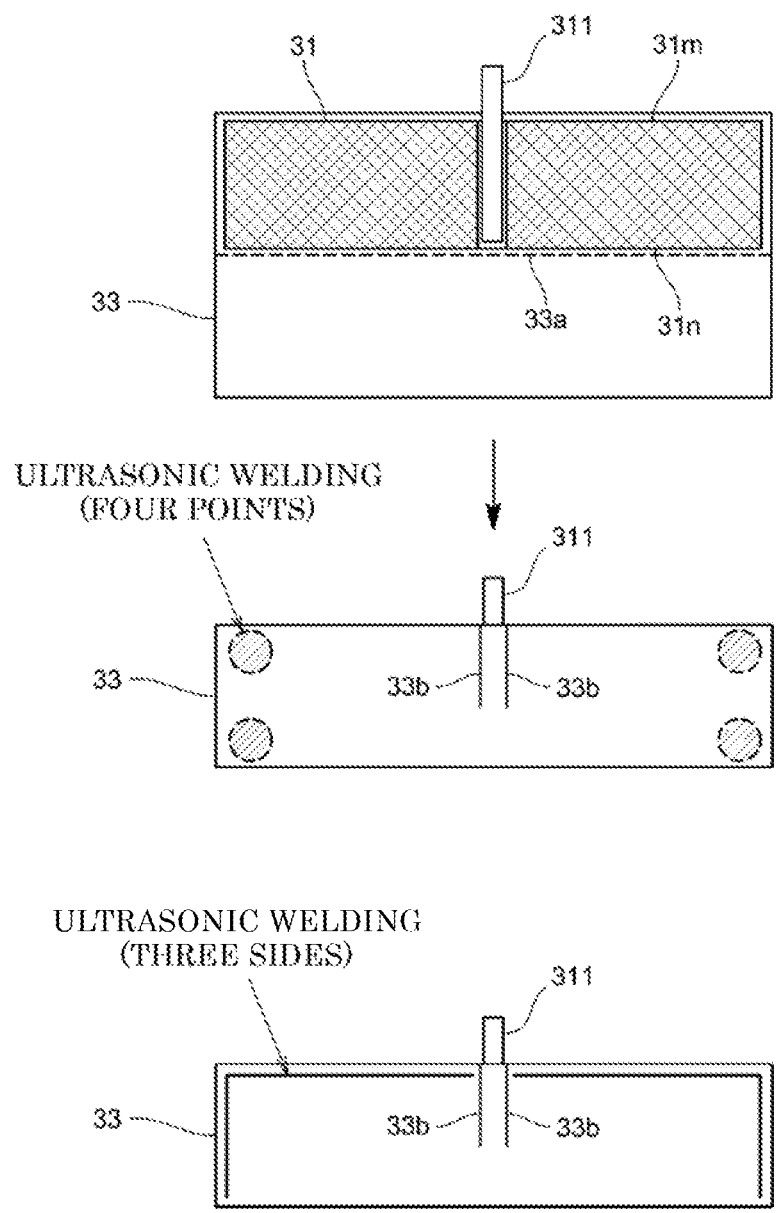
FIG. 12 depicts views showing a separator containing process in the electrode group in the embodiment
Figure 13:
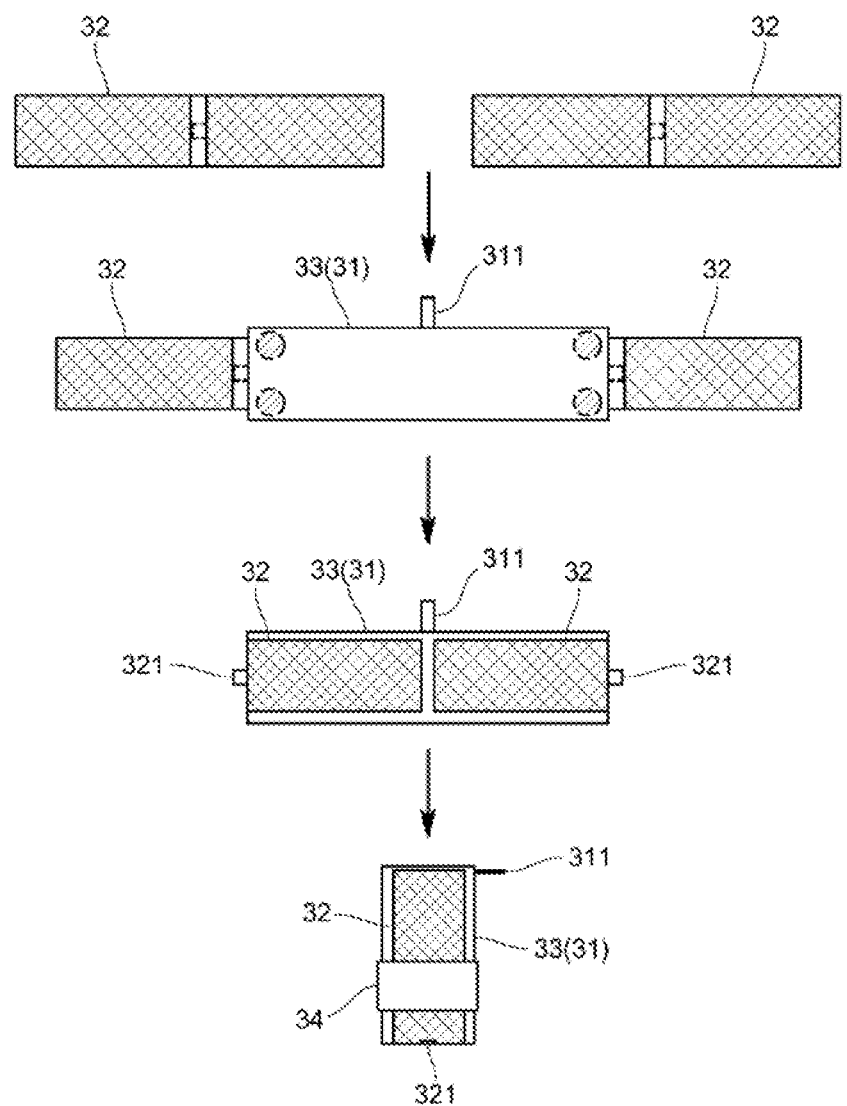
FIG. 13 depicts views showing a negative electrode plate folding process and a positive electrode plate folding process in the electrode group in the embodiment

First, as shown in FIGS. 12 and 13, the positive electrode plate 31 in the developed state, the negative electrode plate 32 in the developed state, and the separator 33 in the developed state are prepared. As shown in FIG. 12, the positive electrode plate 31 in the developed state is placed at one half surface with respect to a folding line 33a of the separator 33. At this time, the positive electrode plate 31 is placed such that a side edge (i.e., the lower side edge 31n), opposite to a side edge (i.e., the upper side edge 31m) on which the current collecting terminal 311 extends outside, is aligned with the folding line 33a of the separator 33. Then, the separator 33 is folded into two along the folding line 33a (a separator containing step). In this manner, the folded portion of the separator 33 is located on the lower side edge 31n of the positive electrode plate 31, so that the positive electrode plate 31 in the developed state is contained in the separator 33 except the portion of the current collecting terminal 311 extending outward. And then, four corners of the separator 33 containing the positive electrode plate 31 therein or three sides of the upper, right, and left sides except the positive electrode terminal portion are securely welded by ultrasonic welding or the like. Here, there are cutouts 33b at the current collecting terminal portion of the positive electrode plate 31 in the separator 33. Consequently, when the current collecting terminal 311 is folded, the separator 33 can be prevented from curling up according to the deformation of the current collecting terminal 311. Incidentally, the use of an envelope-like separator 33 having three sides thereof closed in advance enables the positive electrode plate 32 to be packed.

Next, as shown in FIG. 13, the active material retaining portions 31B disposed on the right and left of the positive electrode plate 31 in the developed state, contained in the separator 33 are layered on one of the active material retaining portions 32B of the negative electrode plate 32 in the developed state. And then, the negative electrode plate 32 in the developed state is folded into a substantial U-shape, so that each of the two active material retaining portions 31B of the positive electrode plate 31 is sandwiched by the negative electrode plate 32 (a negative electrode plate folding step). At this time, the current collecting terminal 321 is folded outward from the active material non-retaining portion 32A of the negative electrode plate 32. Thereafter, the positive electrode plate 31 sandwiched on the right and left thereof by the negative electrode plate 32 is folded into a substantial U-shape (a positive electrode plate folding step). In this manner, the layered electrode group 3 is formed. A bundle tape 34 is wound around the layered electrode group 3 such formed as described above, thus preventing the layered electrode group 3 from being untied.

Moreover, the cylindrical battery 100 in the present embodiment includes a spacer 6 for fixing the electrode group 3 to the battery case 2, as shown in FIGS. 1 and 2. The spacer 6 is interposed between the inside circumferential surface of the battery case 2 and the side surface of the electrode group 3, and includes a pair of spacers 61 and 62 for fixing the electrode group 3 to the battery case 2. The pair of spacers 61 and 62 is disposed in a space defined between the inside circumferential surface of the battery case 2 and the side surface of the electrode group 3, and then, sandwiches the electrode group 3 in a layered direction L. Here, the layered direction L accords with the facing direction in which the respective active material retaining portions 31B and 32B of the electrode plates 31 and 32 face each other.

The pair of spacers 61 and 62 is made of a resin such as an acrylic resin or a polypropylene resin or a metal such as stainless steel, and further, is formed into the same shape as each other.

Each of the spacers 61 and 62 has the same cross-sectional shape in a center axis direction C, and further, is brought into contact with substantially the entire outside surfaces 3a and 3b of the layered electrode group 3 (see FIG. 2). Moreover, each of the spacers 61 and 62 is vertically brought into contact with the inside circumferential surface of the battery case 2. Consequently, the entire electrode group 3 is uniformly pressed by the pair of spacers 61 and 62, thus enhancing electric charge-discharge efficiency.

It is conceived that a portion of each of the spacers 61 and 62 in contact with the battery case 2 is formed into an arcuate shape so as to be brought into contact within a predetermined range of the battery case 2 in a circumferential direction in order to disperse a pressing force exerted on the battery case 2. Here, in the case where the mechanical strength of the battery case 2 can be satisfactorily secured, a portion in contact with the battery case 2 may be formed into a square shape. When the portion in contact with the battery case 2 is formed into a square shape, a space defined between each of the spacers 61 and 62 and the battery case 2 can be made large, thus contributing to an increase in electrolyte solution amount and a reduction of an increase in inner pressure.

Figure 14:
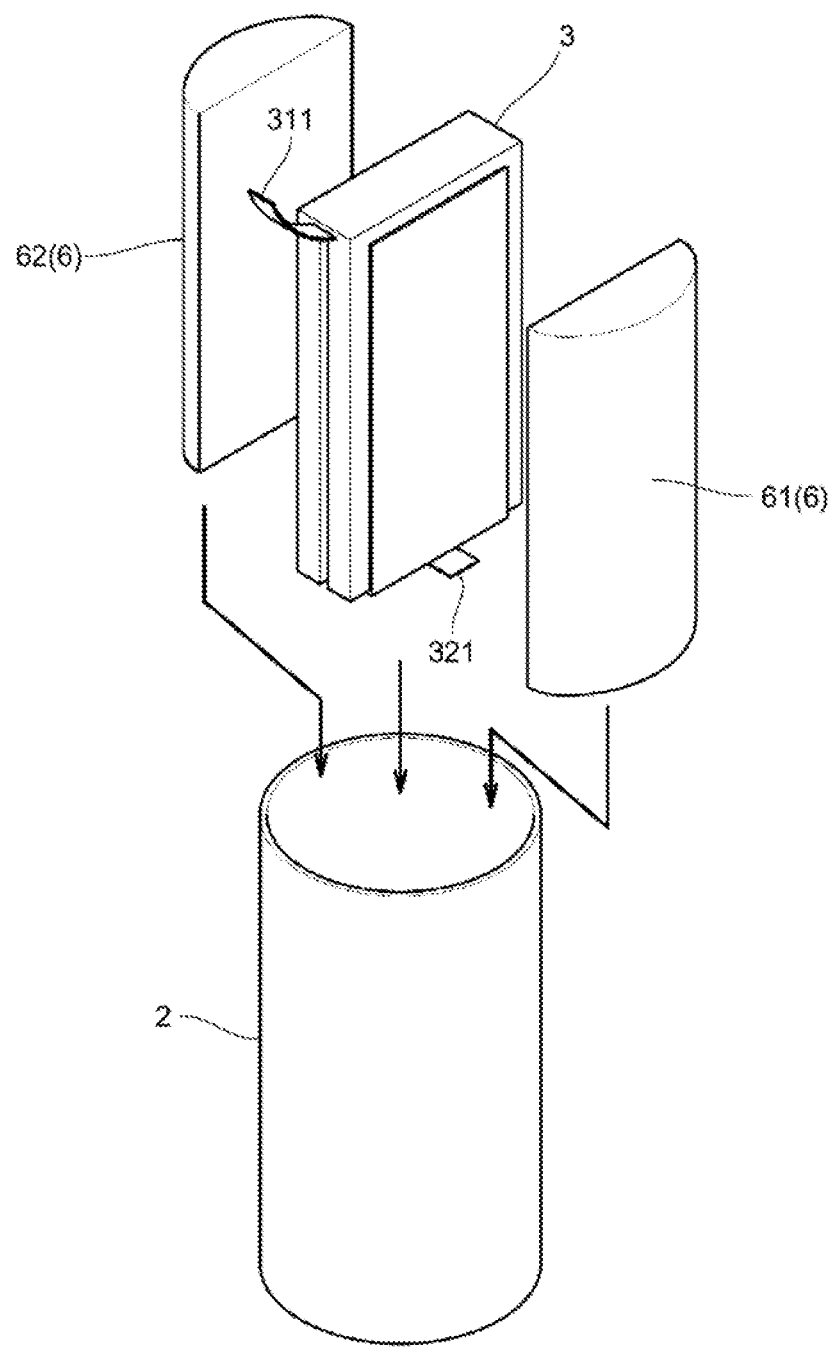
FIG. 14 depicts a developed perspective view showing the cylindrical battery in the embodiment

Subsequently, a manufacturing method for the cylindrical battery 100 such configured as described above will be simply described with reference to FIG. 14. Here, the bundle tape 34 is not shown in the electrode group 3 shown in FIG. 14.

The above-described layered electrode group 3 is housed inside the battery case 2, and then, the current collecting terminal 321 of the negative electrode plate 32 is connected by welding onto the bottom 2B of the battery case 2. Thereafter, the electrode group 3 is sandwiched between the pair of spacers 61 and 62 in the layered direction L, and then, the electrolyte solution is filled into the battery case 2. Subsequently, the current collecting terminal 311 of the positive electrode plate 31 is connected to the back surface of the sealant 5 directly or via the current collecting plate, not shown, and further, the sealant 5 is securely caulked to the upper opening formed at the battery case 2 via the insulator 4.

<Effects of the Present Embodiment>

With the cylindrical battery 100 in the present embodiment such configured as described above, the positive electrode plate 31 and the negative electrode plate 32 are formed into the substantial U-shape such that the two active material retaining portions 31B and 32B are disposed opposite to each other. The common current collecting terminals 311 and 321 can collect currents at the two active material retaining portions 31B and 32B, thus suppressing variations in current collection efficiency so as to enhance the current collection efficiency. Moreover, the current collecting terminals 311 and 321 can be commonly used by the two active material retaining portions 31B and 32B, and therefore, the number of current collecting terminals 311 and 321 to be welded can be reduced, thereby simplifying the welding work. Additionally, the positive electrode plate 31 and the negative electrode plate 32 formed into the substantial U-shape are layered in an interlaced manner, and therefore, the plurality of positive electrode plates 31 and negative electrode plates 32 can be simply layered. In addition, after the stacking, the layered electrode group 3 is hardly untied.

Furthermore, the electrode group 3 having the positive electrode plate 31 and the negative electrode plate 32 layered via the separator 33 is housed inside the battery case 2, thereby providing the cylindrical battery without winding misalignment occurring at the electrode group 3 or various problems incidental to such winding misalignment. Moreover, since the battery case 2 is formed into the cylindrical shape, it can become resistant against an increase in inside pressure. Additionally, the spacers 61 and 62 securely press the electrode group 3 inside the battery case 2, thus preventing any play of the electrode group 3 with respect to the battery case 2. Consequently, it is possible to suppress the active material in the electrode plates 31 and 32 from falling so as to not only prevent degradation of electric charge-discharge performance but also enhance the electric charge-discharge performance.

Figure 15:
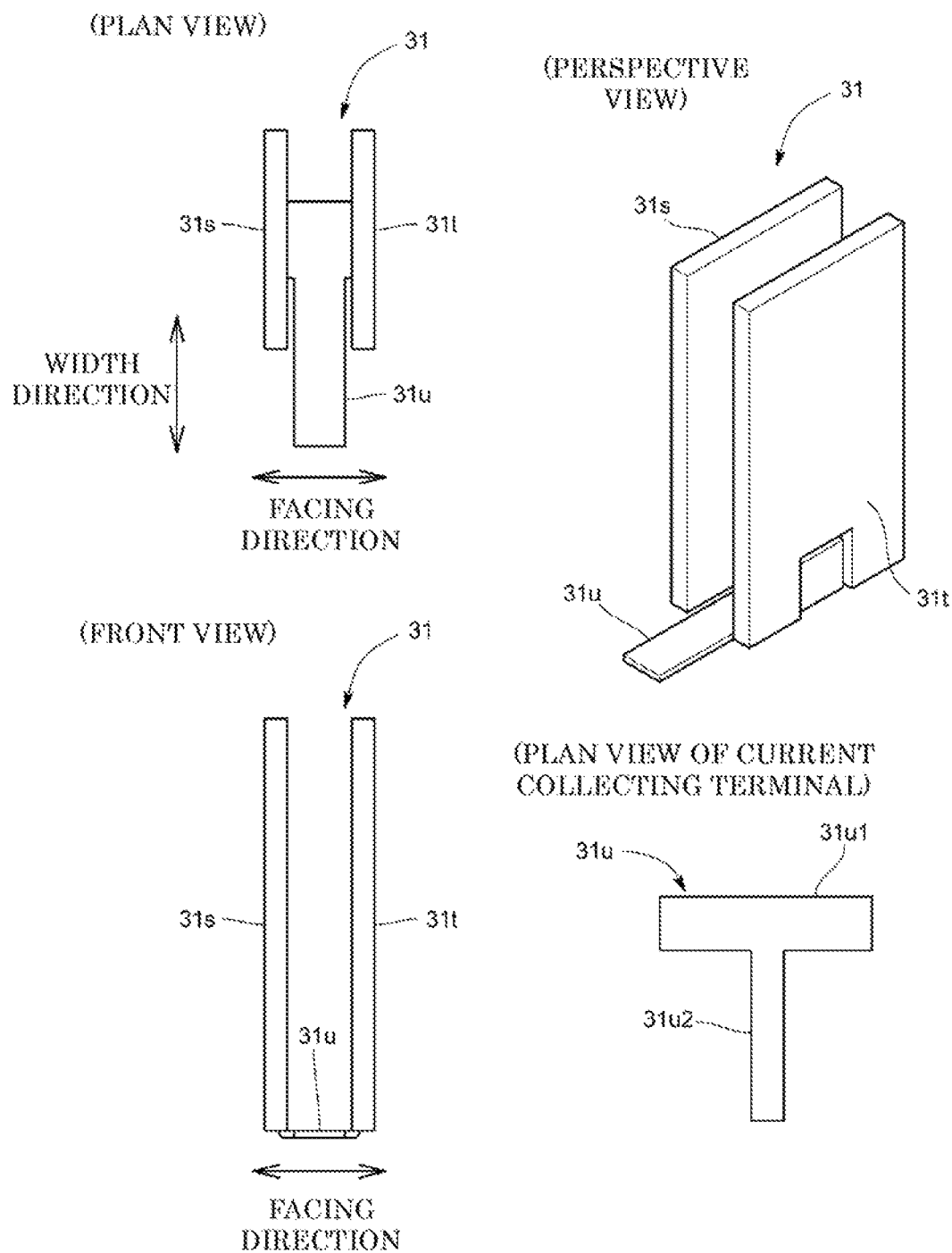
FIG. 15 depicts a plan view, a front view, and a perspective view showing a positive electrode plate in a modified embodiment

The present invention is not limited to the above-described embodiment. For example, in the embodiment, in the positive electrode plate 31, the active material non-retaining portion 31A and the active material retaining portion 31B are constituted of one positive electrode current collector, but it is not limited to this. Specifically, the positive electrode plate 31 may be provided with two active material retaining plates 31s and 31t that retain a positive active material in a positive electrode current collector and a current collecting terminal 31u for connecting the two active material retaining plates 31s and 31t to each other, as shown in FIG. 15. The active material retaining plates 31s and 31t are formed into the same shape as each other, and specifically, are constituted by filling a substantially rectangular foamed nickel with a positive active material. An active material removal part 31x used for welding the current collecting terminal 31u is formed at a part of each of the active material retaining plates 31s and 31t. The current collecting terminal 31u is formed into a substantial T-shape, as viewed on a plane. The right and left ends of a horizontal part 31u1 of the T-shape are welded to the active material removal parts 31x of the active material retaining plates 31s and 31t. In this developed state, a vertical part 31u2 of the T-shape of the current collecting terminal 31u constitutes an extension portion extending outward of the active material retaining plates 31s and 31t in a width direction. The positive electrode plate 31 is folded in a substantial U-shape at the horizontal part 31u1 of the T-shape the current collecting terminal 31u in such a manner that the two active material retaining plates 31s and 31t face each other, and further, the vertical part 31u2 of the T-shape extends outward on one side in the width direction perpendicular to the direction in which the two active material retaining plates 31s and 31t face each other.

Figure 16:
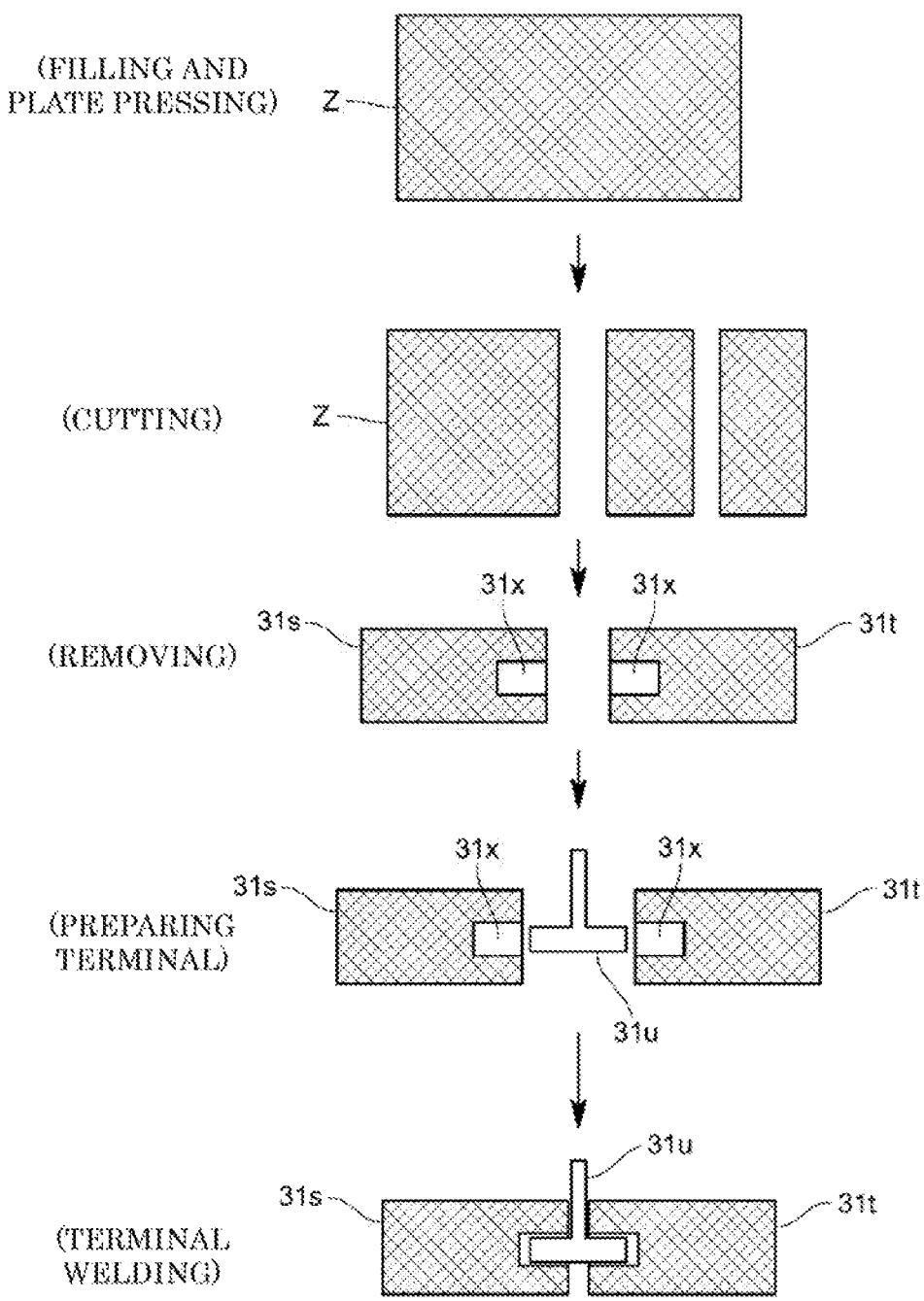
FIG. 16 depicts views showing manufacturing processes for the positive electrode plate in the modified embodiment

Next, brief explanation will be made on a manufacturing method for the positive electrode plate 31 such configured as described above. As illustrated in FIG. 16, the entire elongated preform Z made of foamed nickel (i.e., a current collector substrate) is filled with an active material (an active material filling step). After the active material filling step, the entire current collector substrate is pressed (an electrode plate pressing step). Subsequently, the preform Z filled with the active material is cut into the size of each of the active material retaining portions 31s and 31t (a cutting step). And then, the positive active material is removed by ultrasonic removing or the like so as to form the active material removal part 31x formed into the substantially rectangular shape at the center on the short side of each of the cut active material retaining portions 31s and 31t (an active material removing step). Thereafter, the respective ends of the horizontal part 31u1 of the T-shape of the T-shaped terminal 31u are welded to the two active material removal parts 31x (a terminal welding step). Here, the T-shaped terminal is not limited to an integral terminal, and two current collecting terminals formed into a strip-like shape may be welded to each other in a T-shape. Alternatively, the two active material retaining portions 31s and 31t may be connected to each other via a connecting member other than the current collecting terminal, and then, the current collecting terminal may be welded to the connecting member.

Figure 17:
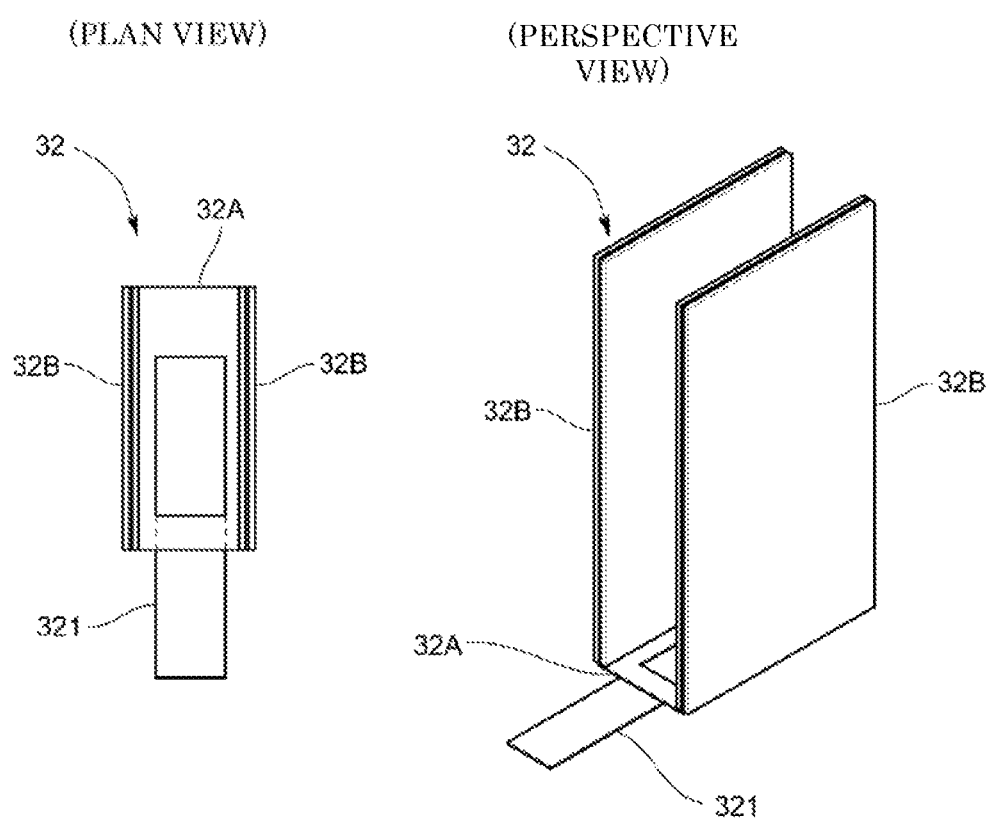
FIG. 17 depicts a plan view and a perspective view showing a modification of the negative electrode plate

Although the current collecting terminal 321 of the negative electrode plate 32 in the above-described embodiment has been folded outward of the active material retaining portion 32B while using the boundary between the active material non-retaining portion 32A and the active material retaining portion 32B as the folding line, the folding line may not be the boundary between the active material non-retaining portion 32A and the active material retaining portion 32B. Additionally, as illustrated in FIG. 17, the current collecting terminal 321 may extend outward on one side in the width direction perpendicular to the direction in which the active material retaining portions 32B face each other. In this case, it is possible to increase the degree of freedom of choices of the length of the current collecting terminal 321. Here, the positive electrode plate 31 may adopt the configuration of the negative electrode plate 32. Alternatively, the negative electrode plate 32 may adopt the same configuration as that of the positive electrode plate 31 in the above-described embodiment. Furthermore, even if the current collecting terminal 321 is not welded to the battery case 2, only a contact can achieve conduction.

Moreover, although the positive electrode plate and the negative electrode plate have been formed into the substantial U-shape obtained by folding them in the substantial U-shape in one embodiment, they may be folded into a substantial V-shape or literally the substantial U-shape.

Figure 18:
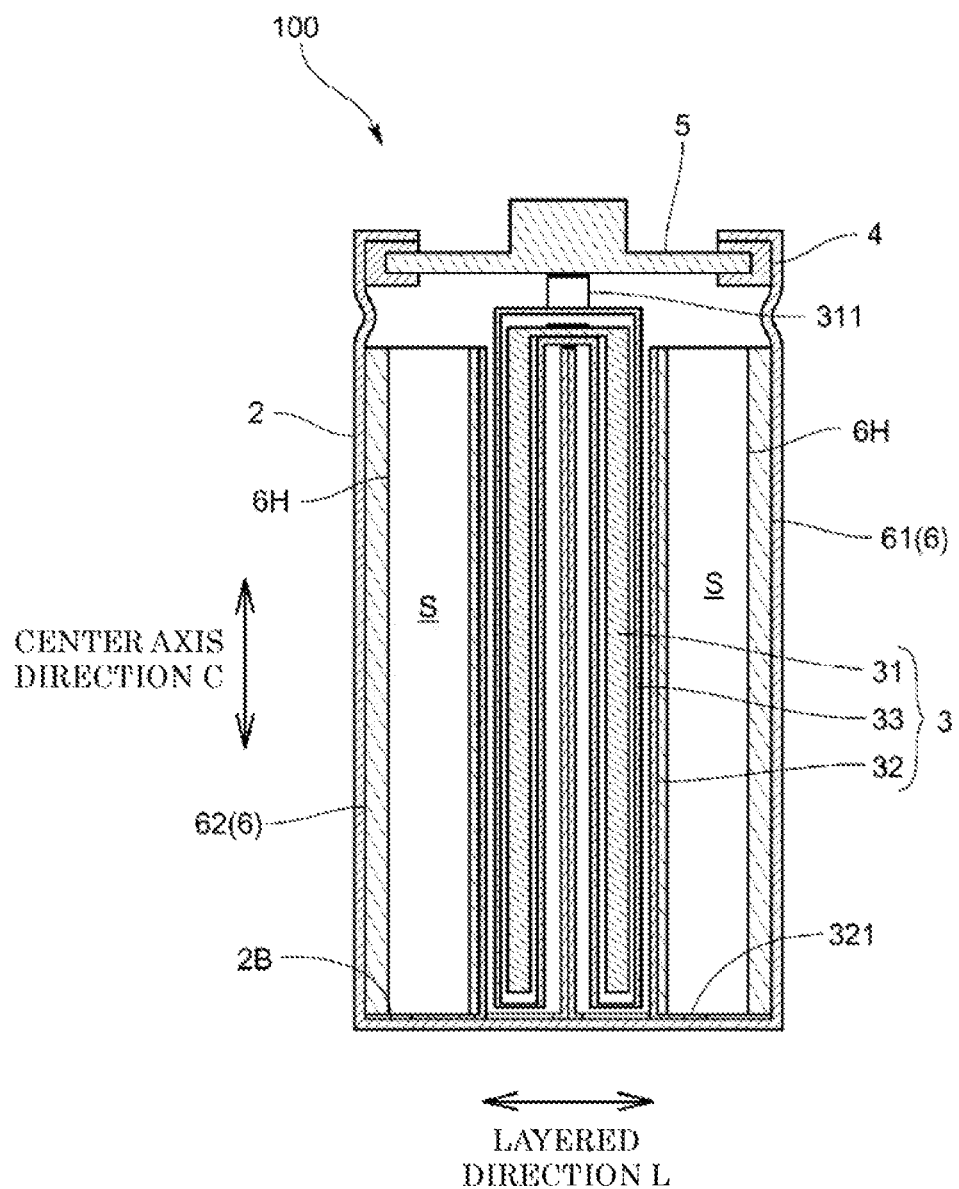
FIG. 18 depicts a vertically cross-sectional view showing a cylindrical battery in a modified embodiment
Figure 19:
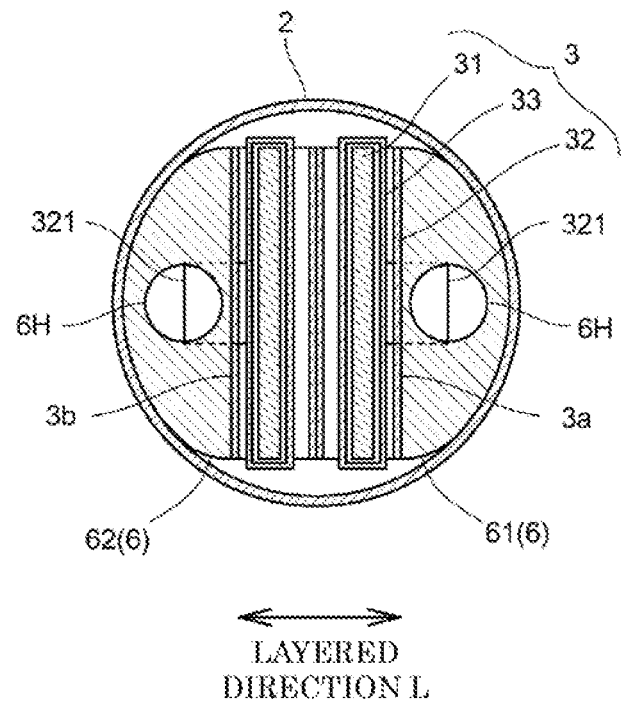
FIG. 19 depicts a laterally cross-sectional view showing the cylindrical battery in the modified embodiment.

Each of the spacers is not limited to that in the above-described embodiment. Vertically (the center axis direction C) communicating spaces S, into which welding rods for welding the current collecting terminal 321 of the negative electrode plate 32 at the electrode group 3 onto the bottom 2B of the battery case 2, may be formed, as shown in FIGS. 18 and 19. The space S communicates from the bottom 2B of the battery case 2 toward the upper opening of the battery case 2. Specifically, each of the spacers 61 and 62 has a vertically communicating insertion hole 6H, into which a welding rod is inserted. The insertion hole 6H may be formed into any shapes as long as the insertion of the welding rod achieves welding, and therefore, it is not limited to a circle but a polygon or an ellipse. The insertion hole 6H is formed at such a position that the current collecting terminal 321 of the negative electrode plate 32 can be contained inside the insertion hole 6H in the state in which the electrode group 3 is fixed by the spacers 61 and 62, and further, is determined according to the position of the current collecting terminal 321 of the negative electrode plate 32.

In this manner, since each of the spacers 61 and 62 has the insertion holes 6H formed thereat, the current collecting terminal 321 of the negative electrode plate 32 can be welded after the electrode group 3 and the spacers 61 and 62 are inserted into the battery case 2. In the case where the spacers 61 and 62 are inserted after the current collecting terminal 321 of the negative electrode plate 32 is welded, the position of the electrode group 3 may be possibly changed before and after the spacers 61 and 62 are inserted, thereby raising a fear of the rupture or breakage occurring at the welded portion. However, the welding after insertion of the spacers 61 and 62 does not raise the problem.

Figure 20:
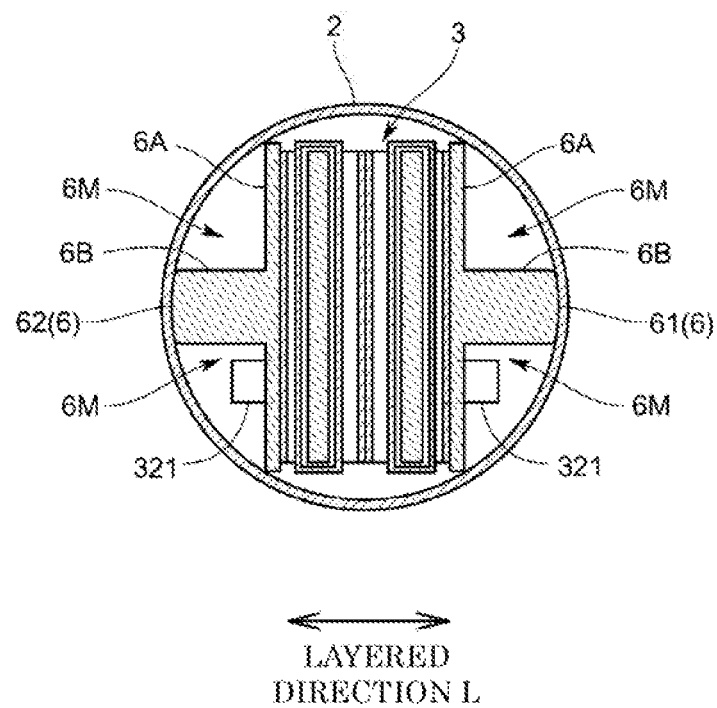
FIG. 20 depicts a laterally cross-sectional view of a cylindrical battery showing a modification of a spacer

Besides securing the welding spaces with the insertion holes 6H formed at the spacers 61 and 62, welding spaces may be defined according to the shape of the outside appearance of the spacers 61 and 62 without forming the insertion holes 6H formed at the spacers 61 and 62, as shown in FIG. 20. Specifically, it is conceived that the shape of the outside appearance of the spacers 61 and 62 has recesses 6M formed at side surfaces thereof and has the same cross-sectional shape in a center axis direction C. In FIG. 20, there are provided an electrode contact portion 6A in contact with the outermost surface of the electrode group 3 in the layered direction, a case contact portion 6B in contact with the inner circumferential surface of the battery case 2, and the recesses 6M formed therebetween. With this configuration, after the spacers 61 and 62 are inserted, the current collecting terminal 321 of the negative electrode plate 32 can be welded to the bottom 2B of the battery case 2 with the welding spaces defined by the recesses 6M formed at the spacers 61 and 62.

Figure 21:
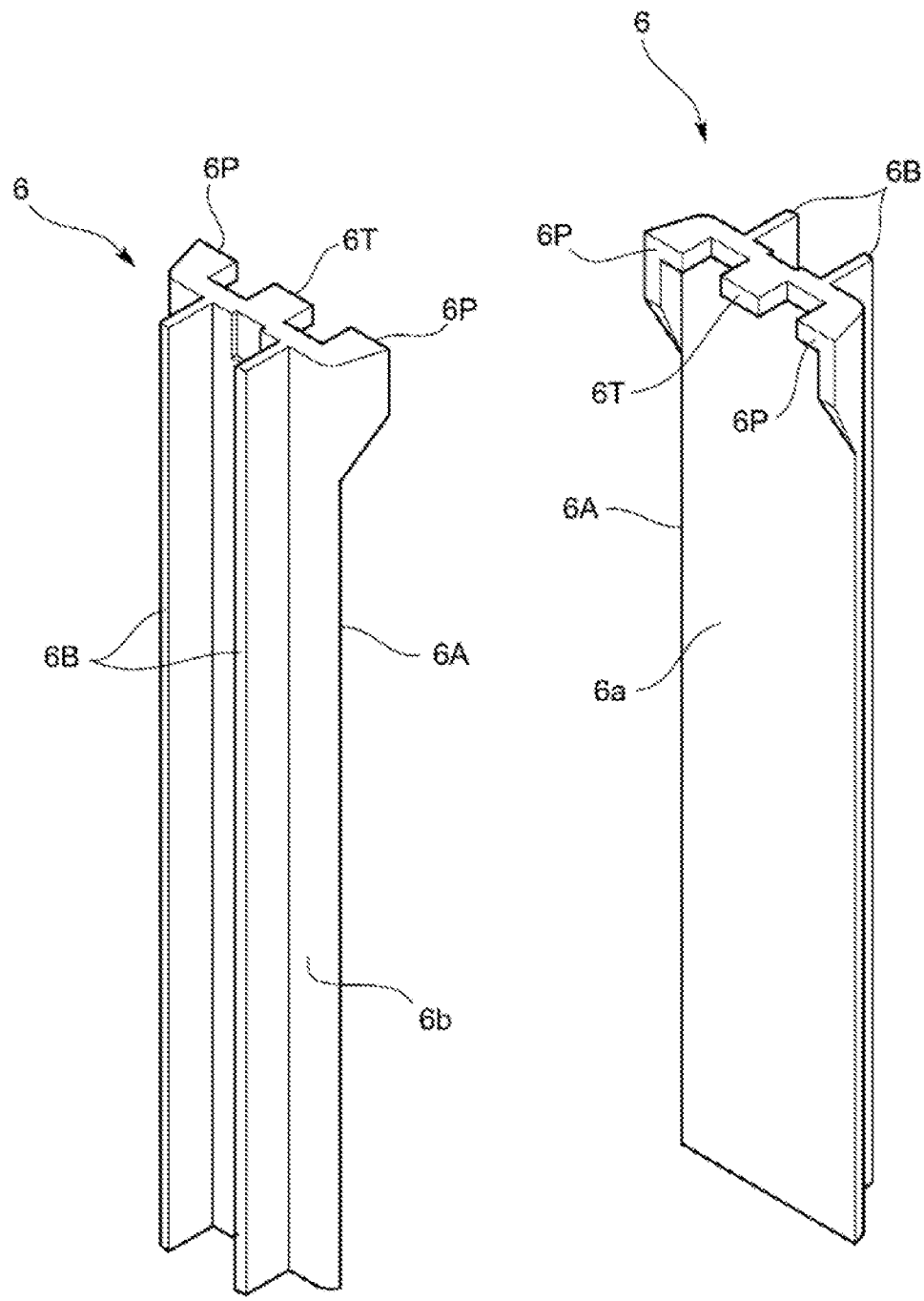
FIG. 21 depicts a perspective view showing the spacer in the modified embodiment
Figure 22:
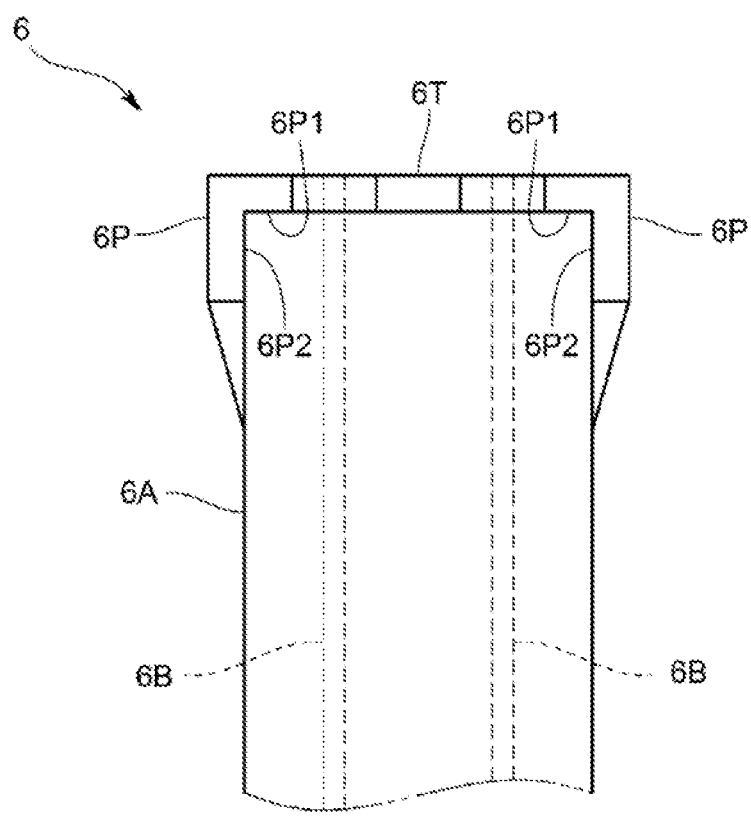
FIG. 22 depicts a front view showing, in partly enlargement, the spacer in the modified embodiment

Specifically, the spacer 6 is formed into an equal cross-sectional shape having the rectangular plate-like electrode contact portion 6A having a contact surface on one surface 6a in contact with the substantially the entire outermost surface (specifically, the negative electrode plate 32) of the electrode group 3 in the layered direction L and the two case contacts 6B extending from the other surface 6b of the electrode contact portion 6A and being brought into contact with the inside circumferential surface 2A of the battery case 2, as shown in FIGS. 21 and 22.

The electrode contact portion 6A has substantially the same shape as the outermost surface of the electrode group 3 in the layered direction L. At the upper portion of the electrode contact portion 6A is formed a projecting piece 6T facing the upper surface of the electrode group 3. The projecting piece 6T substantially extends perpendicularly from one surface 6a of the electrode contact portion 6A at the upper end center of the electrode contact portion 6A. Moreover, a wall 6P surrounding the upper corner of the electrode group 3 is formed at an upper corner of the electrode contact portion 6A. The surrounding wall 6P includes an upper wall 6P1 facing the upper surface of the electrode group 3 and side walls 6P2 facing right and left side surfaces of the electrode group 3 (see FIG. 22).

The two case contacts 6B are formed in parallel along the center axis direction C at the other surface 6b of the electrode contact portion 6A. Specifically, the two case contacts 6B are symmetrically formed in such a manner as to sandwich the center axis of the battery case 2 in the state contained in the battery case 2. A contact portion with the inside circumferential surface 2A of the battery case 2 at the case contact portion 6B has substantially the same curve as that of the inside circumferential surface 2A of the battery case 2. As a consequence, the spacer 6 is such configured that the case contact portion 6B and the battery case 2 are brought into surface contact with each other (see FIG. 23).

Figure 23:
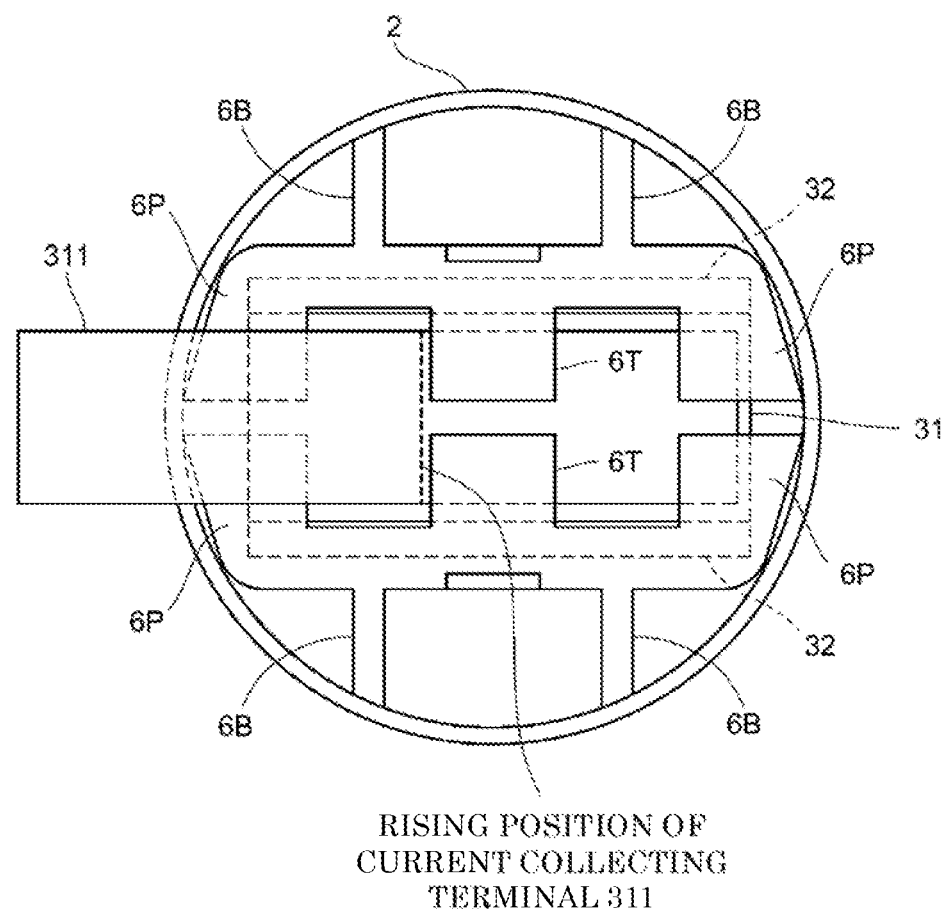
FIG. 23 depicts a view showing a state in which the spacer and an electrode group are contained in a battery case in the modified embodiment

When the electrode group 3 is disposed in the battery case 2 in such a manner as to be sandwiched in the above-described spacer 6, the projecting pieces 6T of the two spacers 6, as shown in FIG. 23, contact and press the current collecting terminal 311 of the positive electrode plate 31. Incidentally, a free end side beyond a portion in contact with the projecting piece 6T in the current collecting terminal 311 is folded, to be thus welded to the sealant 5. Here, the current collecting terminal 311 rises at a position near the projecting piece 6T. Moreover, the surrounding walls 6P of the two spacers 6 contain therein the upper corners of the positive electrode plate 31 and the negative electrode plate 32.

The formation of the projecting piece 6T facing the upper surface of the electrode group 3 brings the projecting piece 6T into contact with the current collecting terminal 311 welded to the upper surface of the positive electrode plate 31, thus preventing the current collecting terminal 311 from being positionally misaligned, and further, preventing the welded portion of the current collecting terminal 311 from being broken and peeled off. Moreover, the formation of the surrounding wall 6P surrounding the upper corner of the electrode group 3 at the upper portion of the spacer 6 can prevent the battery case 2 and the positive electrode plate 31 from being brought into contact with each other, and further, can prevent the current collecting terminal 311 of the positive electrode plate 31 and the negative electrode plate 32 from being brought into contact with each other. Additionally, it is possible to prevent any misalignment of the positive electrode plate 31 and the negative electrode plate 32 in the electrode group 3. In addition, the formation of the surrounding wall 6P can eliminate disposing an upper insulating plate that has been required in the related art, thus simplifying the manufacturing process, and further, reducing a material cost.

Although the layered electrode group 3 in the embodiment has been constituted of one positive electrode plate 31 and the two negative electrode plates 32 in stacking, a plurality of positive electrode plates 31 and a plurality of negative electrode plates 32 may be layered one on another.

Figure 24A:
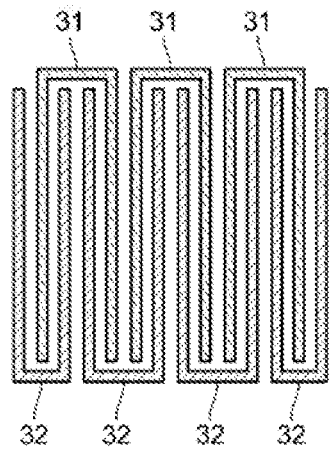
FIGS. 24A, 24B, and 24C depict schematic views showing a modification of a layered pattern of a layered electrode group

In this case, as shown in FIG. 24A, the electrode group 3 is conceived to be layered such that the positive electrode plate 31 sandwiches one active material retaining portion 32B in each of the two adjacent negative electrode plates 32 therebetween whereas the negative electrode plate 32 sandwiches one active material retaining portion 31B in each of the two adjacent positive electrode plates 31 therebetween except electrode plates located on both outer sides in a layered direction (i.e., the negative electrode plates 32 in FIG. 24A). In this manner, the positive electrode plates 31 and the negative electrode plates 32 are layered to be sandwiched therebetween, so that the layered electrode group can be hardly misaligned.

Figure 24B:
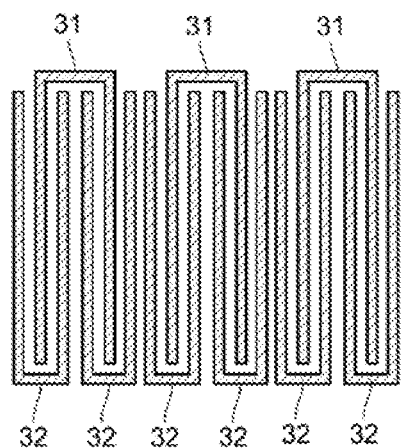

Alternatively, as shown in FIG. 24B, a plurality of units, each consisting of one positive electrode plate 31 and the two negative electrode plates 32 in stacking in the above-described embodiment, may be layered. In this case, an increase or decrease in number of units can match with the size of the battery case, and further, can readily increase or decrease the capacity of the battery.

Figure 24C:
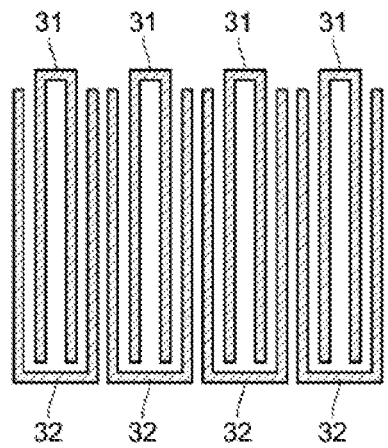

In addition, as shown in FIG. 24C, two active material retaining portions 31B of one positive electrode plate 31 are sandwiched between two active material retaining portions 32B of one negative electrode plate 32 in stacking. In this manner, one positive electrode plate 31 and one negative electrode plate 32 can manufacture a unit of a minimum capacity. An increase or decrease in number of units can finely increase or decrease the capacity of the battery.

Moreover, the layered electrode group is not limited to the layered configuration in which the active material non-retaining portion 31A of the positive electrode plate 31 and the active material non-retaining portion 32A of the negative electrode plate 32 face each other, like the above-described embodiment. As shown in FIG. 25, the electrode group may be configured in stacking such that the active material non-retaining portion 31A of the positive electrode plate 31 and the active material non-retaining portion 32A of the negative electrode plate 32 do not face each other. In other words, the active material non-retaining portion 31A of the positive electrode plate 31 and the active material non-retaining portion 32A of the negative electrode plate 32 may be arranged at right angles in stacking.

The present invention may be applicable to a secondary cell such as a lithium-ion secondary cell or to a primary cell, besides the alkaline secondary battery. Moreover, the present invention may be applicable to a prismatic cell, besides the cylindrical battery.

Furthermore, it is to be understood that the present invention should not be limited to the above-described embodiment, and therefore, can be variously modified without departing from the scope.

INDUSTRIAL APPLICABILITY

According to the present invention, the current collecting terminal is commonly used by the two active material retaining portions that retain the active material therein, thus preventing any variations of the current collecting efficiency, and further, the decrease in number of current collecting terminals can not only simplify the welding work but also simplify the operation for layering the plurality of electrode plates.

The invention claimed is:

1. A cylindrical battery comprising a layered electrode group in a cylindrical battery case, the layered electrode group comprising:
   a positive electrode plate retaining a positive active material in a positive electrode current collector;
   a negative electrode plate retaining a negative active material in a negative electrode current collector; and
   a separator interposed between the positive electrode plate and the negative electrode plate,
   wherein the positive electrode plate is formed into a substantial U-shape by disposing two active material retaining portions opposite to each other, each of two active material retaining portions at the positive electrode plate retaining the positive active material on both surfaces of the positive electrode current collector,
   the negative electrode plate is formed into a substantial U-shape by disposing two active material retaining portions opposite to each other, each of two active material retaining portions at the negative electrode plate retaining the negative active material on both surfaces of the negative electrode current collector,
   the positive electrode plate and the negative electrode plate are layered into a substantially rectangular parallelepiped shape such that at least one active material retaining portion of either one of the positive electrode plate and the negative electrode plate is sandwiched between two active material retaining portions of the other one of the positive electrode plate and the negative electrode plate, and
   two of the active material retaining portions at two of the negative electrode plates adjacent to each other are sandwiched between two of the active material retaining portions of one of the positive electrode plate, or two of the active material retaining portions at two of the positive electrode plates adjacent to each other are sandwiched between two of the active material retaining portions of one of the negative electrode plate.

2. The cylindrical battery according to claim 1, wherein a folded portion formed between the two active material retaining portions at the positive electrode plate and a folded portion formed between the two active material retaining portions at the negative electrode plate face each other in stacking.

3. The cylindrical battery according to claim 1, wherein the separator is folded in half to sandwich both surfaces of the positive electrode plate or the negative electrode plate in a state in which the positive electrode plate or the negative electrode plate is developed.

4. The cylindrical battery according to claim 1, wherein at least one active material retaining portion at one of the positive electrode plate and the negative electrode plate is sandwiched by the other one of the positive electrode plate and the negative electrode plate,
   the other one of the positive electrode plate and the negative electrode plate includes an active material non-retaining portion, which is not coated with an active material, and active material retaining portions, which are formed on both sides while sandwiching the active material non-retaining portion and are coated with an active material,
   the current collector is folded at the active material non-retaining portion such that the active material retaining portions on both sides face each other, and
   a part of the active material non-retaining portion at the other one of the positive electrode plate and the negative electrode plate is folded outward to form the current collecting terminal.

5. The cylindrical battery according to claim 1, wherein the positive electrode plate and the negative electrode plate are layered in a direction perpendicular to a center axis direction of the cylindrical battery case.

6. A cylindrical battery comprising a layered electrode group in a cylindrical battery case, the layered electrode group comprising:
   a positive electrode plate retaining a positive active material in a positive electrode current collector;
   a negative electrode plate retaining a negative active material in a negative electrode current collector; and
   a separator interposed between the positive electrode plate and the negative electrode plate,
   wherein the positive electrode plate is formed into a substantial U-shape by disposing two active material retaining portions retaining the positive active material opposite to each other,
   the negative electrode plate is formed into a substantial U-shape by disposing two active material retaining portions retaining the negative active material opposite to each other,
   the positive electrode plate and the negative electrode plate are layered into a substantially rectangular parallelepiped shape such that at least one active material retaining portion of either one of the positive electrode plate and the negative electrode plate is sandwiched between two active material retaining portions of the other one of the positive electrode plate and the negative electrode plate, and
   the positive electrode plate or the negative electrode plate has a current collecting terminal extending outward from a folded portion formed between the two active material retaining portions, the current collecting terminal having a first side and a second side opposite to the first side, the first side being in direct contact with the folded portion and extending in a direction parallel to a folding line of the folded portion, and
   a direction extending from the first side to the second side is parallel to a direction in which the two active material retaining portions of the positive electrode plate or the negative electrode plate face each other.

7. A cylindrical battery comprising a layered electrode group in a cylindrical battery case, the layered electrode group comprising:
   a positive electrode plate retaining a positive active material in a positive electrode current collector;
   a negative electrode plate retaining a negative active material in a negative electrode current collector; and
   a separator interposed between the positive electrode plate and the negative electrode plate,
   wherein the positive electrode plate is formed into a substantial U-shape by disposing two active material retaining portions retaining the positive active material opposite to each other,
   the negative electrode plate is formed into a substantial U-shape by disposing two active material retaining portions retaining the negative active material opposite to each other,
   the positive electrode plate and the negative electrode plate are layered into a substantially rectangular parallelepiped shape such that at least one active material retaining portion of either one of the positive electrode plate and the negative electrode plate is sandwiched between two active material retaining portions of the other one of the positive electrode plate and the negative electrode plate, the positive electrode plate or the negative electrode plate has a current collecting terminal extending outward from and in direct contact with a folded portion formed between the two active material retaining portions, a folding line of the folded portion being parallel to a width direction perpendicular to a direction in which the two active material retaining portions of the positive electrode plate or the negative electrode plate face each other, a longitudinal side of the current collecting terminal extending outward in the width direction, and in the positive electrode plate or the negative electrode plate having the current collecting terminal extending from the folded portion, the separator is disposed to cover the positive electrode plate or the negative electrode plate, and the separator has a cutout at a portion corresponding to the current collecting terminal extending from the folded portion.

8. The cylindrical battery according to claim 6, wherein the positive electrode plate and the negative electrode plate are layered in a direction perpendicular to a center axis direction of the cylindrical battery case.

9. The cylindrical battery according to claim 7, wherein the positive electrode plate and the negative electrode plate are layered in a direction perpendicular to a center axis direction of the cylindrical battery case.

10. A manufacturing method for the cylindrical battery according to claim 1, the method comprising:
    a negative electrode plate folding step of folding a negative electrode plate in a developed state in a substantial U-shape to sandwich two active material retaining portions disposed at a positive electrode plate in a developed state between the folded negative electrode plate; and
    a positive electrode plate folding step of folding the positive electrode plate whose two active material retaining portions are sandwiched in the folded negative electrode plate in a substantial U-shape.

11. The manufacturing method for the cylindrical battery according to claim 10, further comprising a separator containing step of surrounding the positive electrode plate with a separator to sandwich both surfaces of the positive electrode plate in the developed state before the negative electrode plate folding step.

* * * * *